United States Patent Office 3,315,436
Patented Apr. 25, 1967

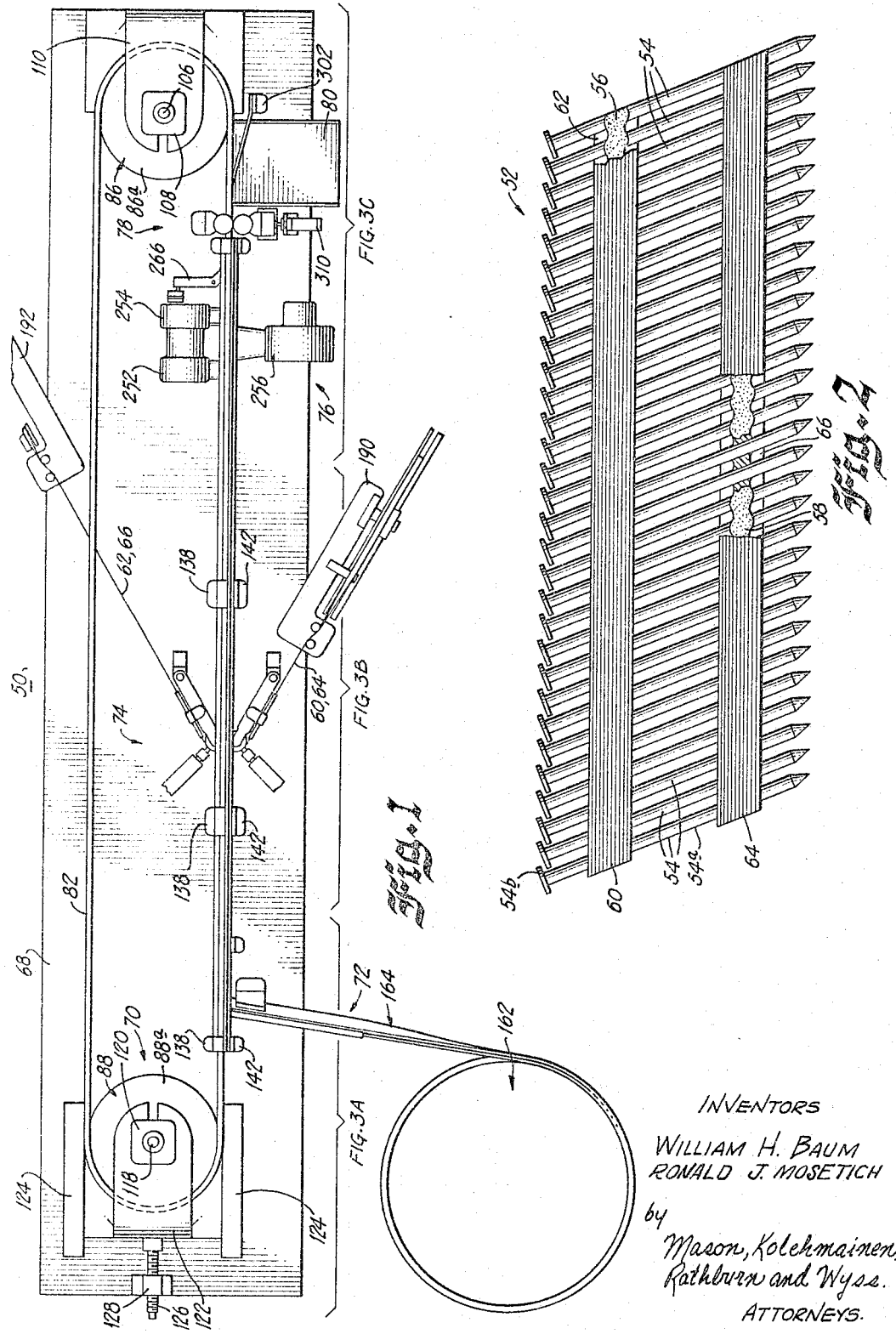

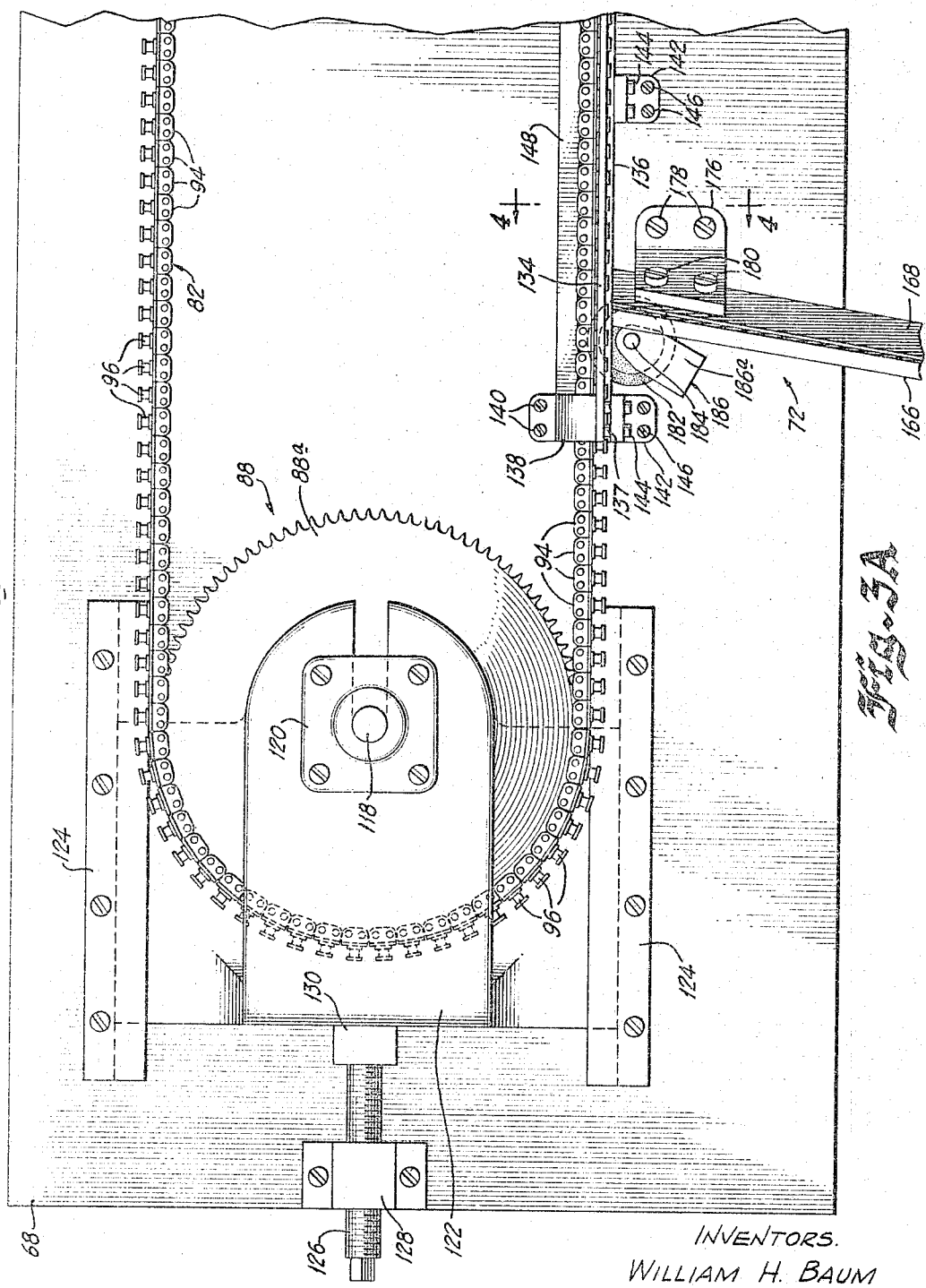

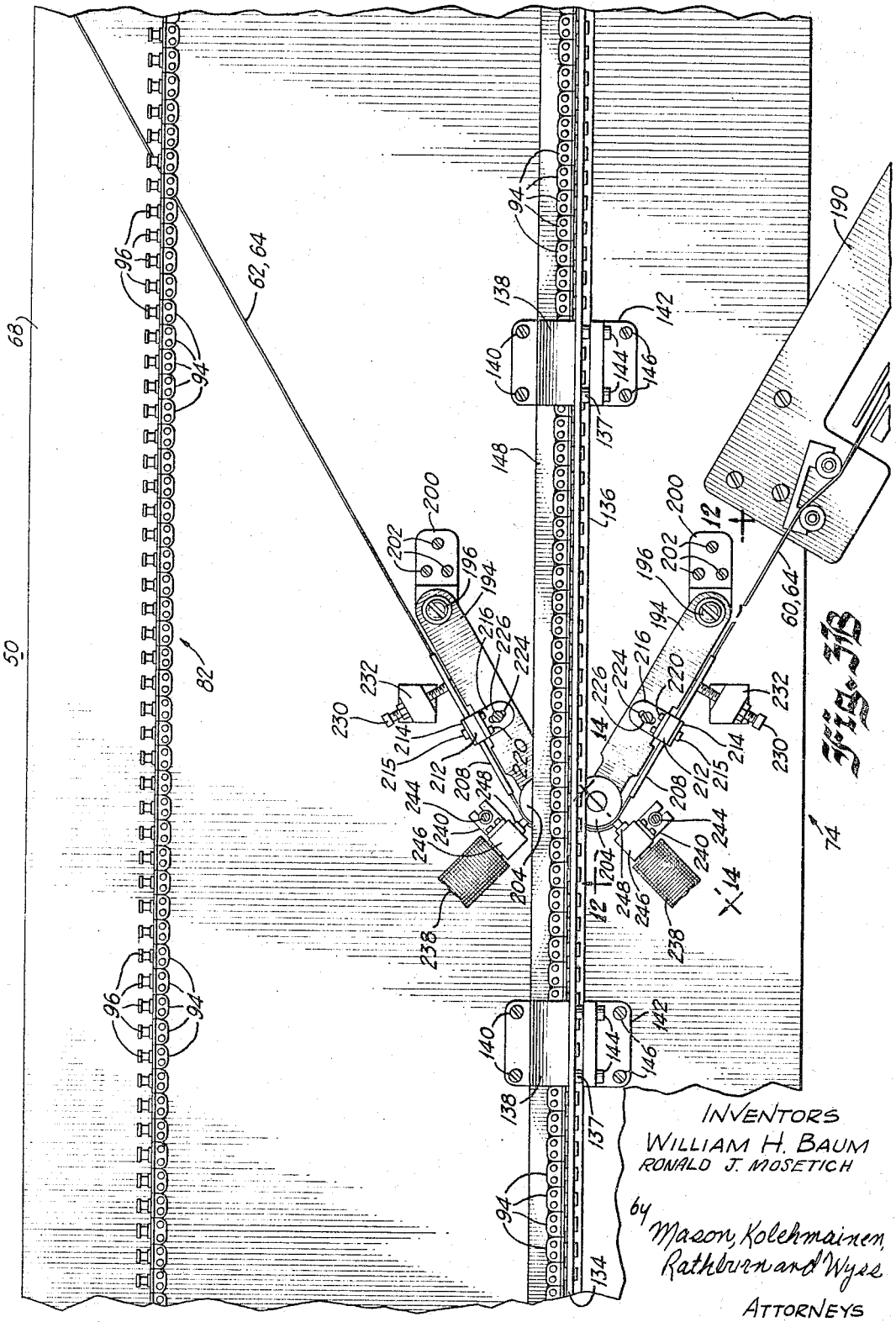

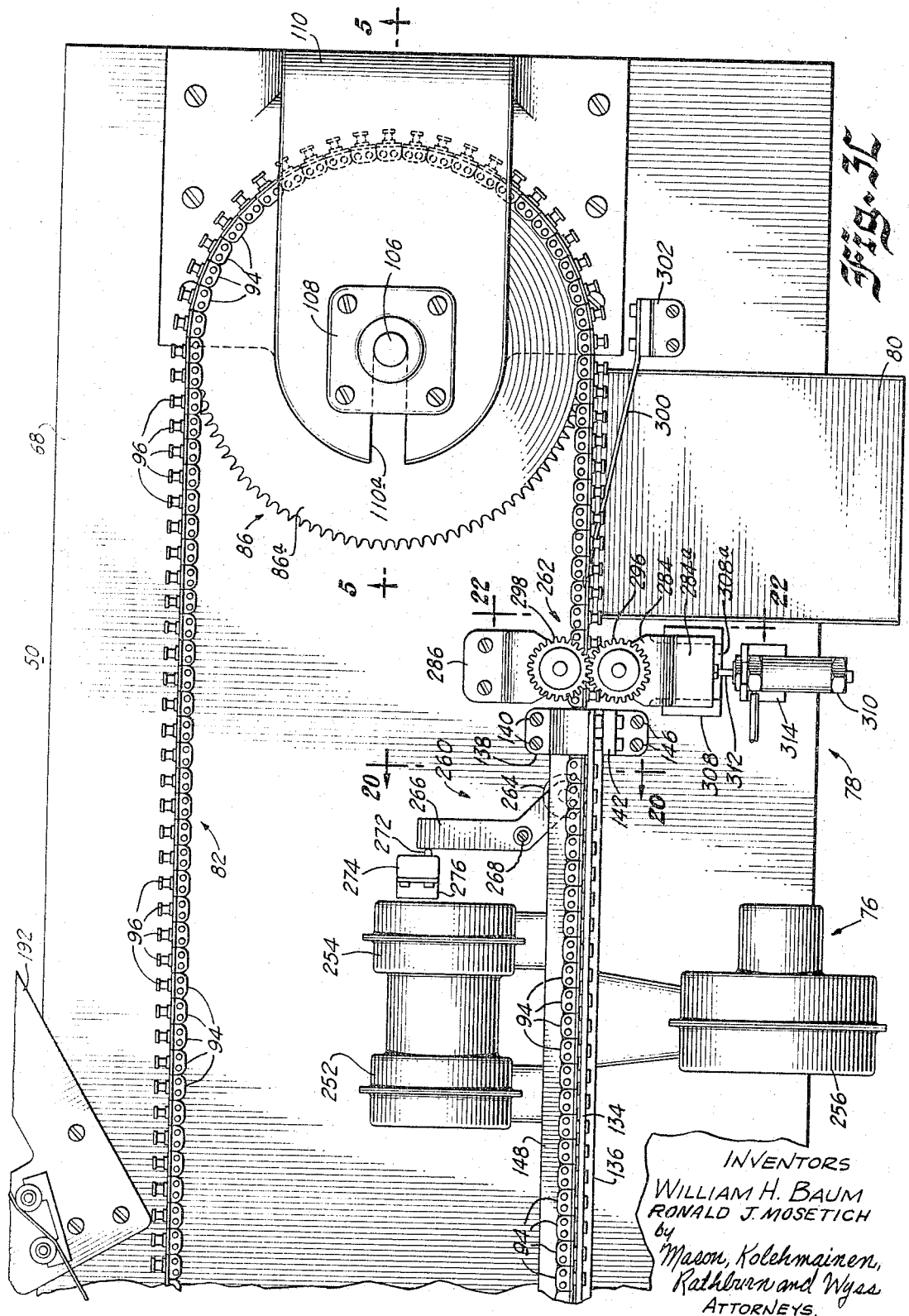

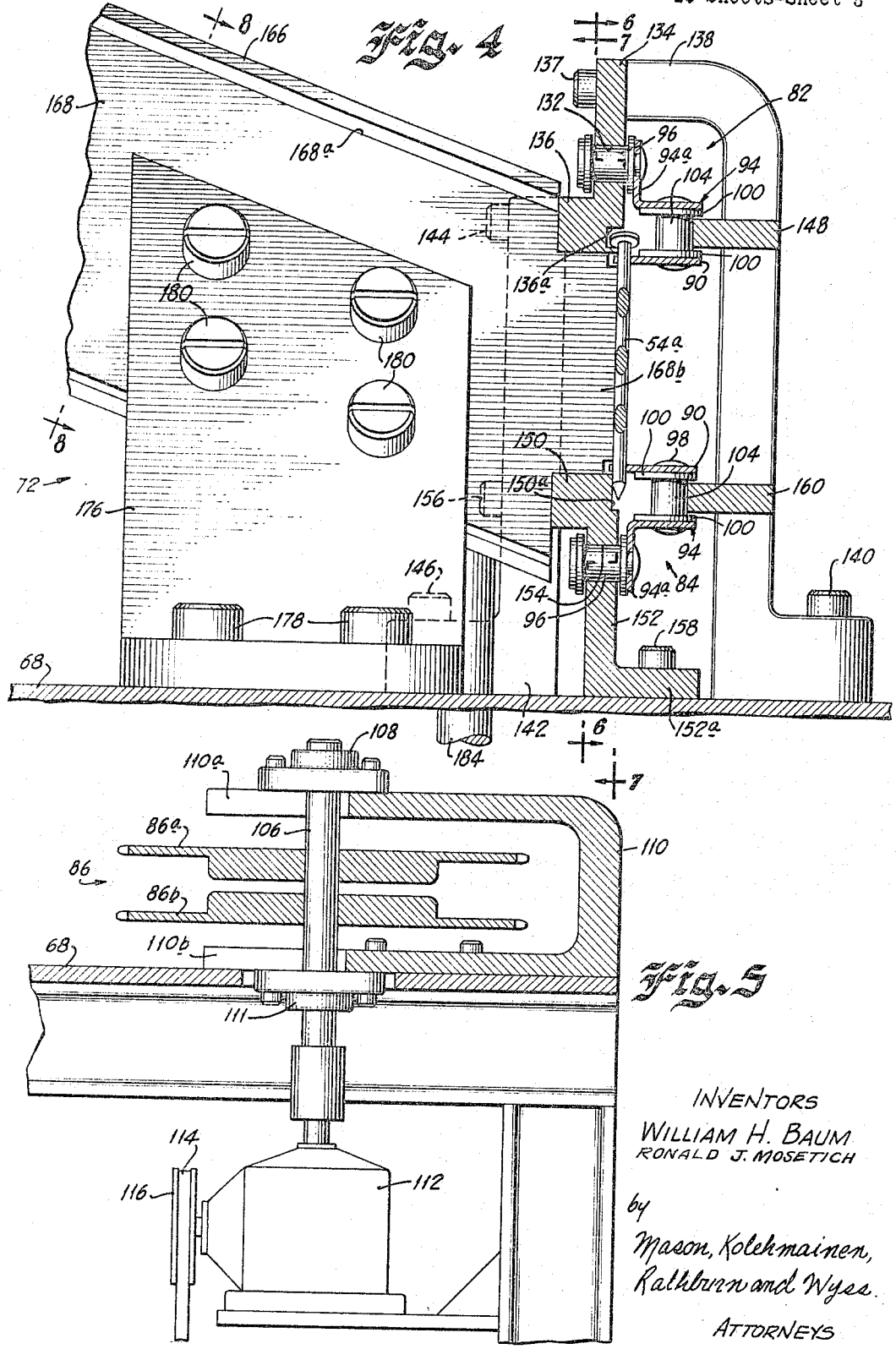

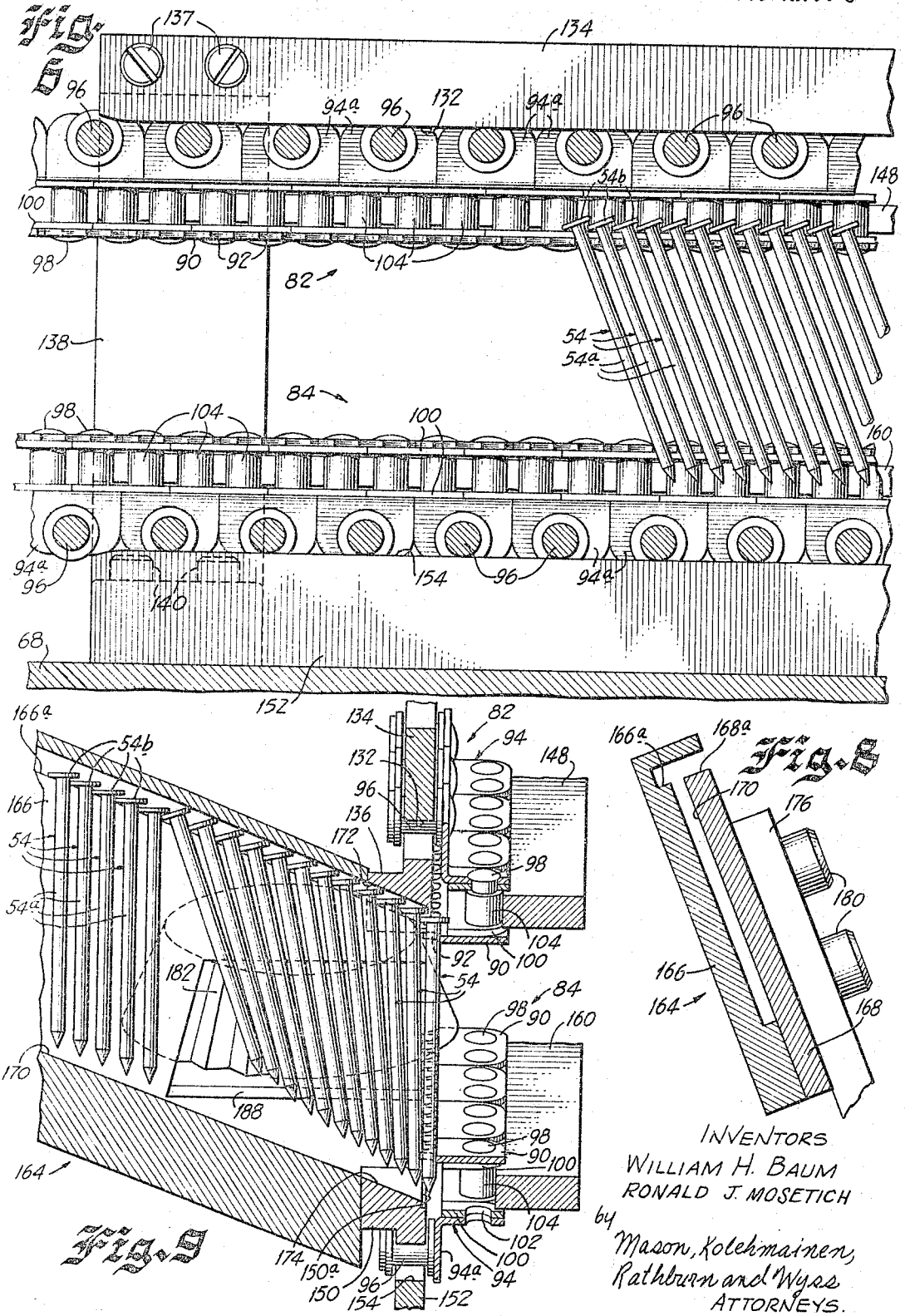

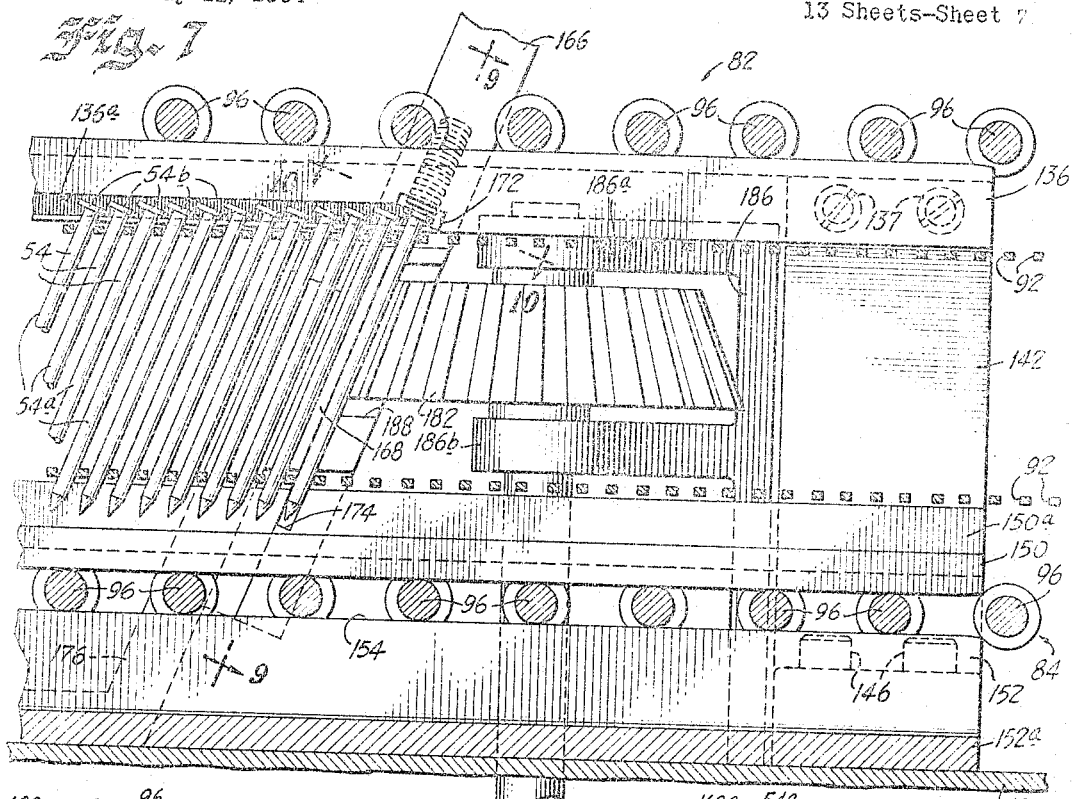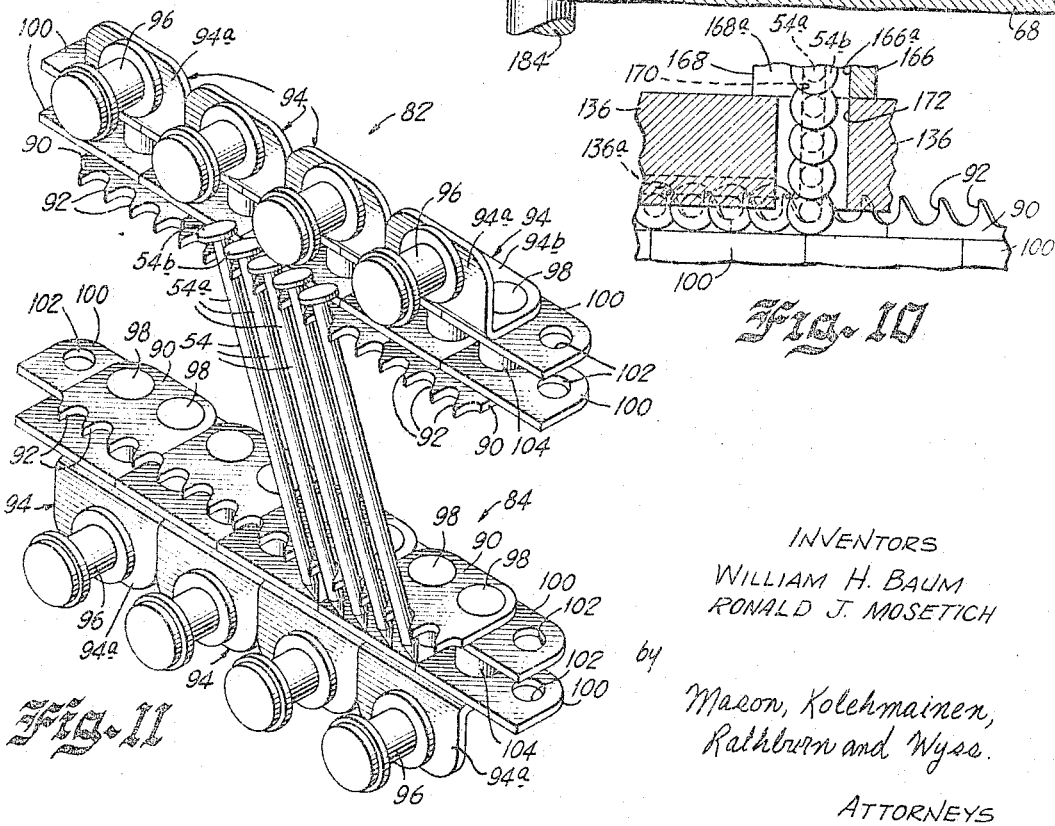

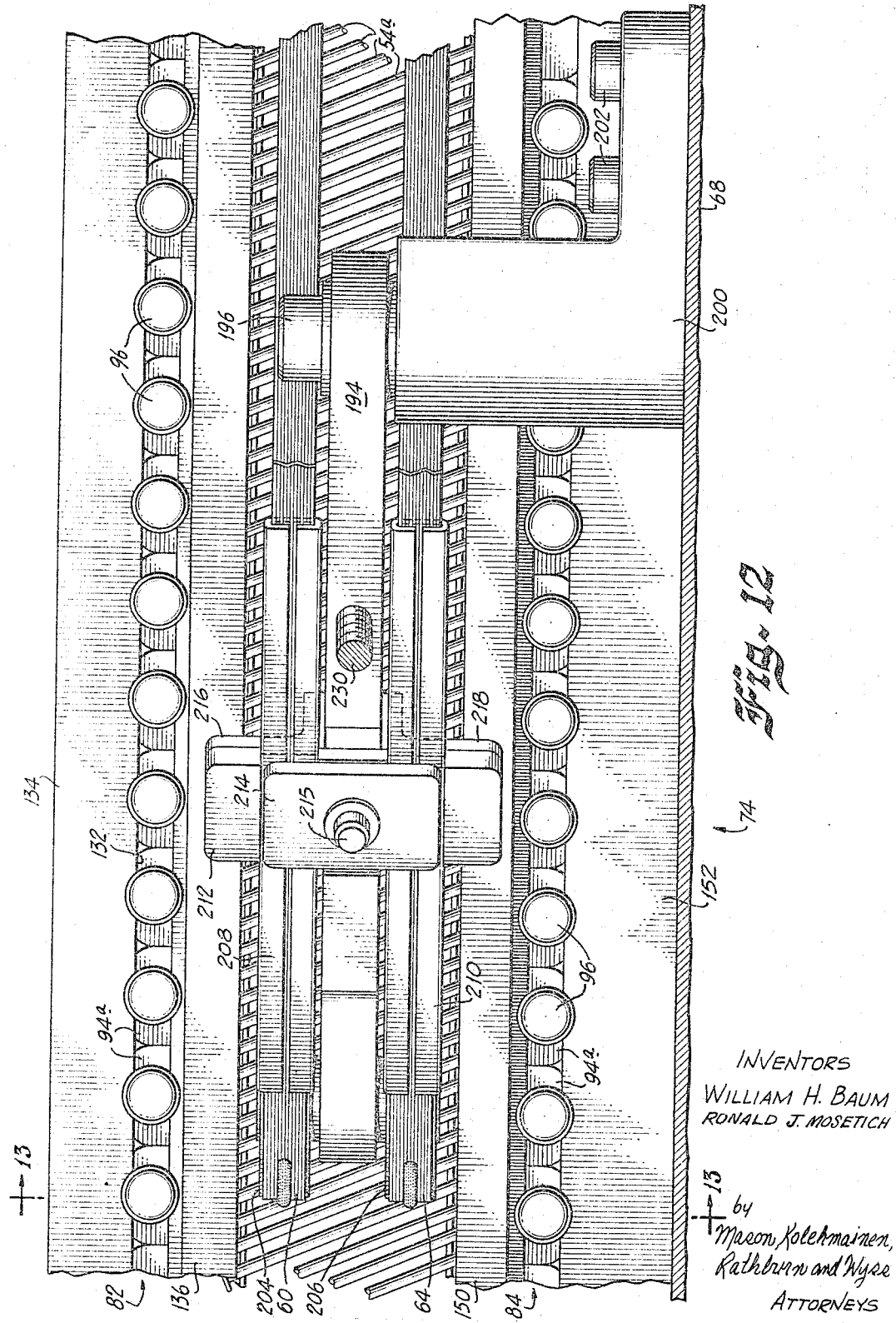

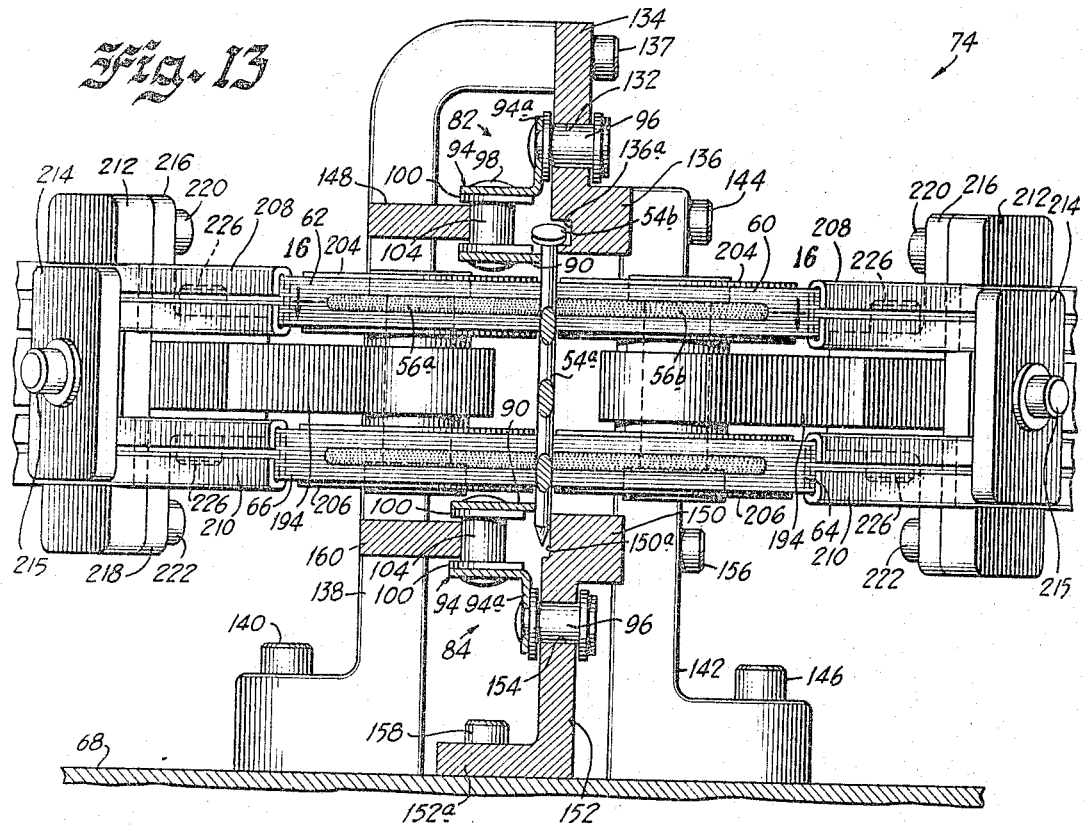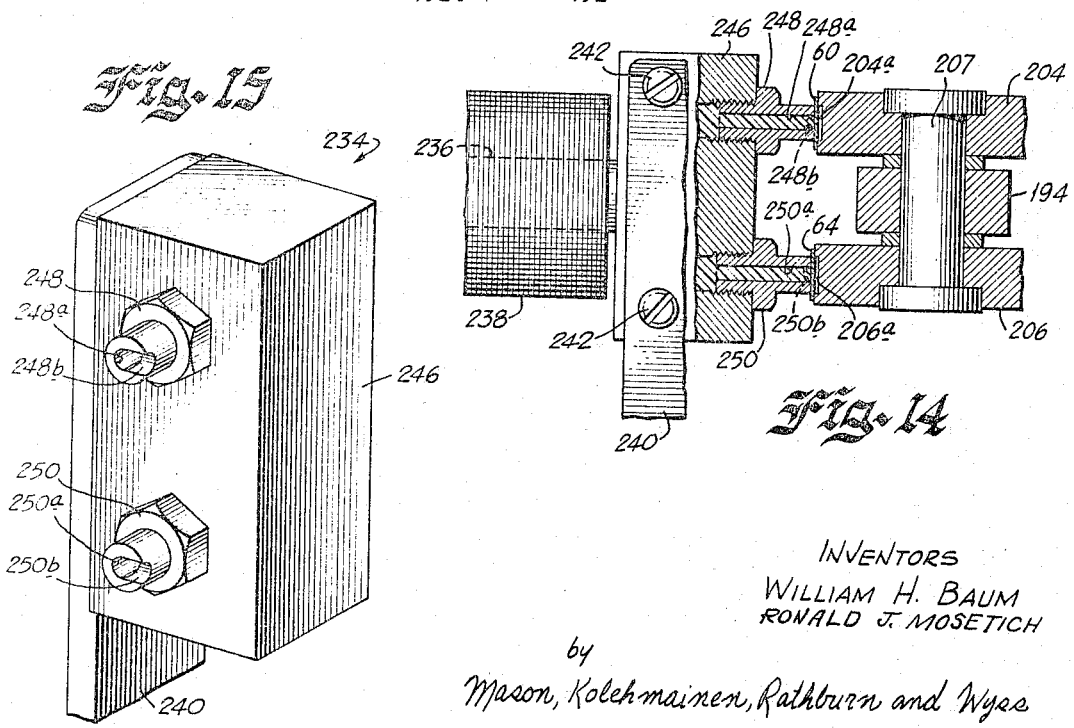

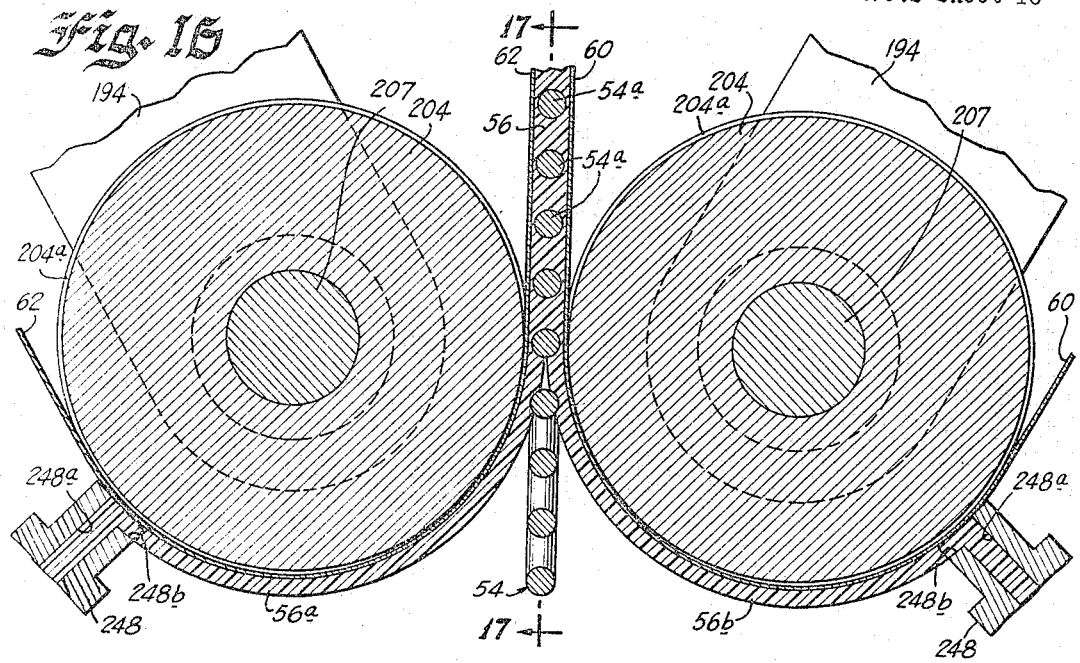
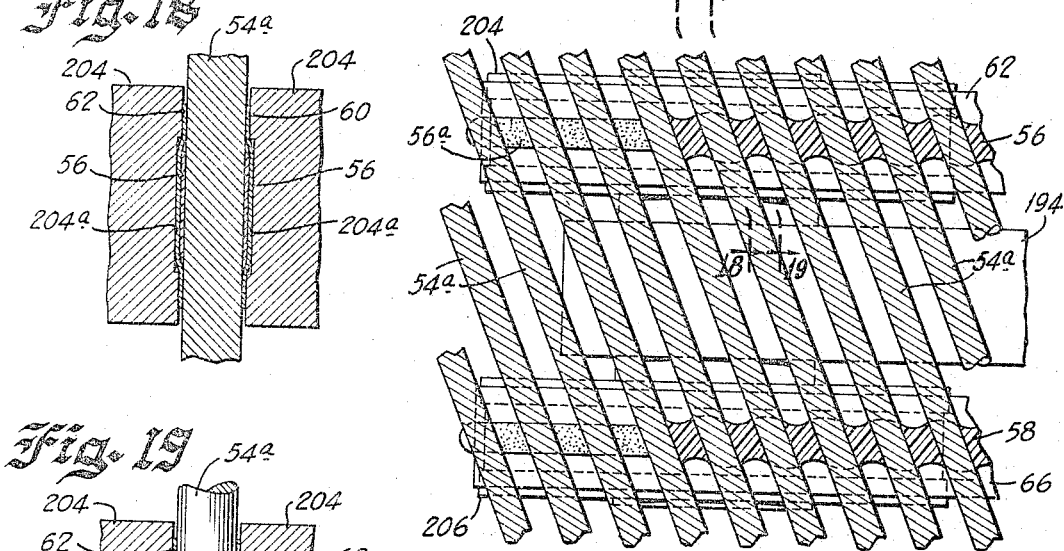
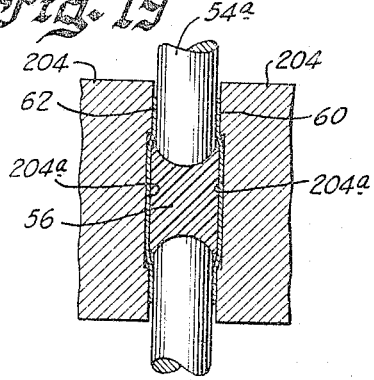

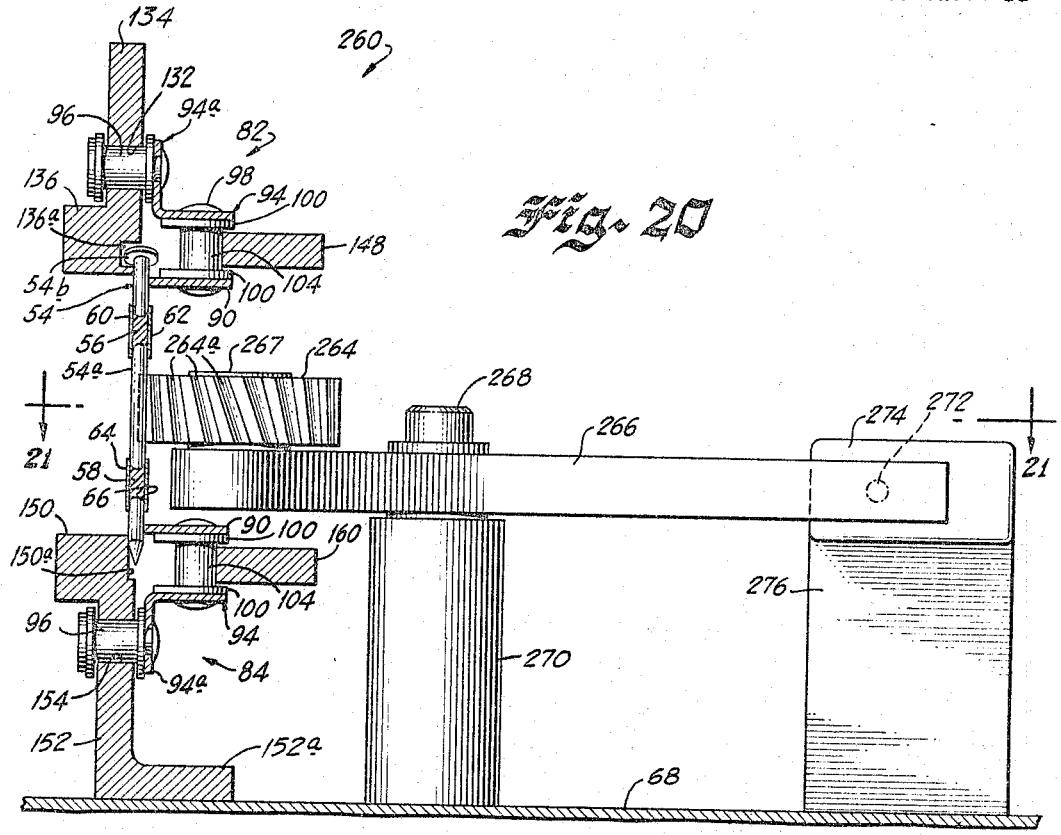
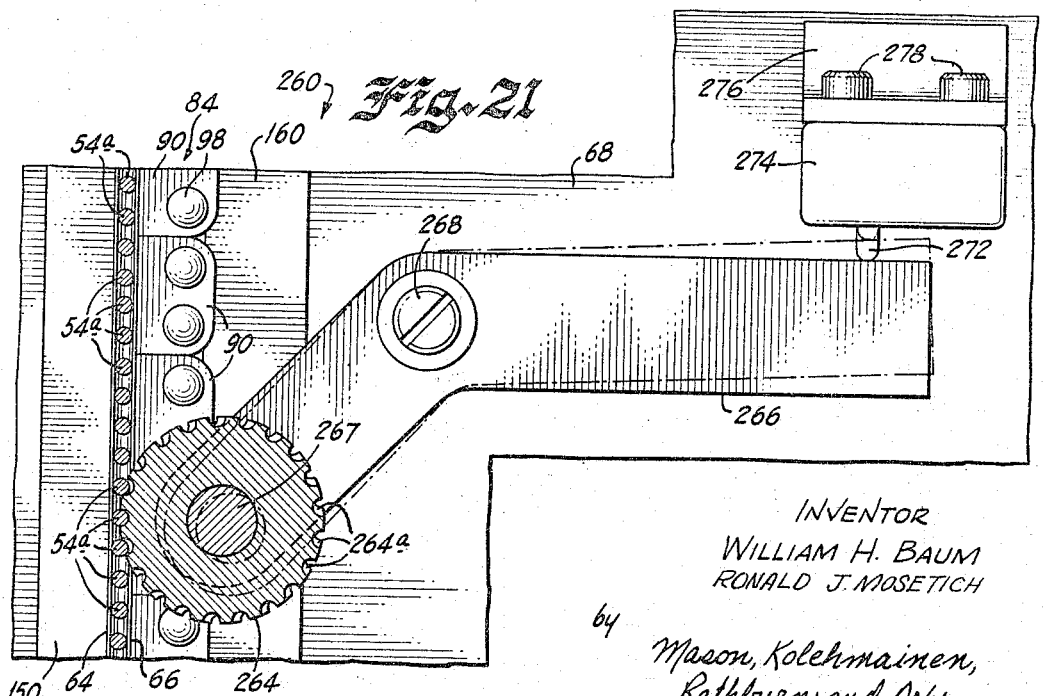

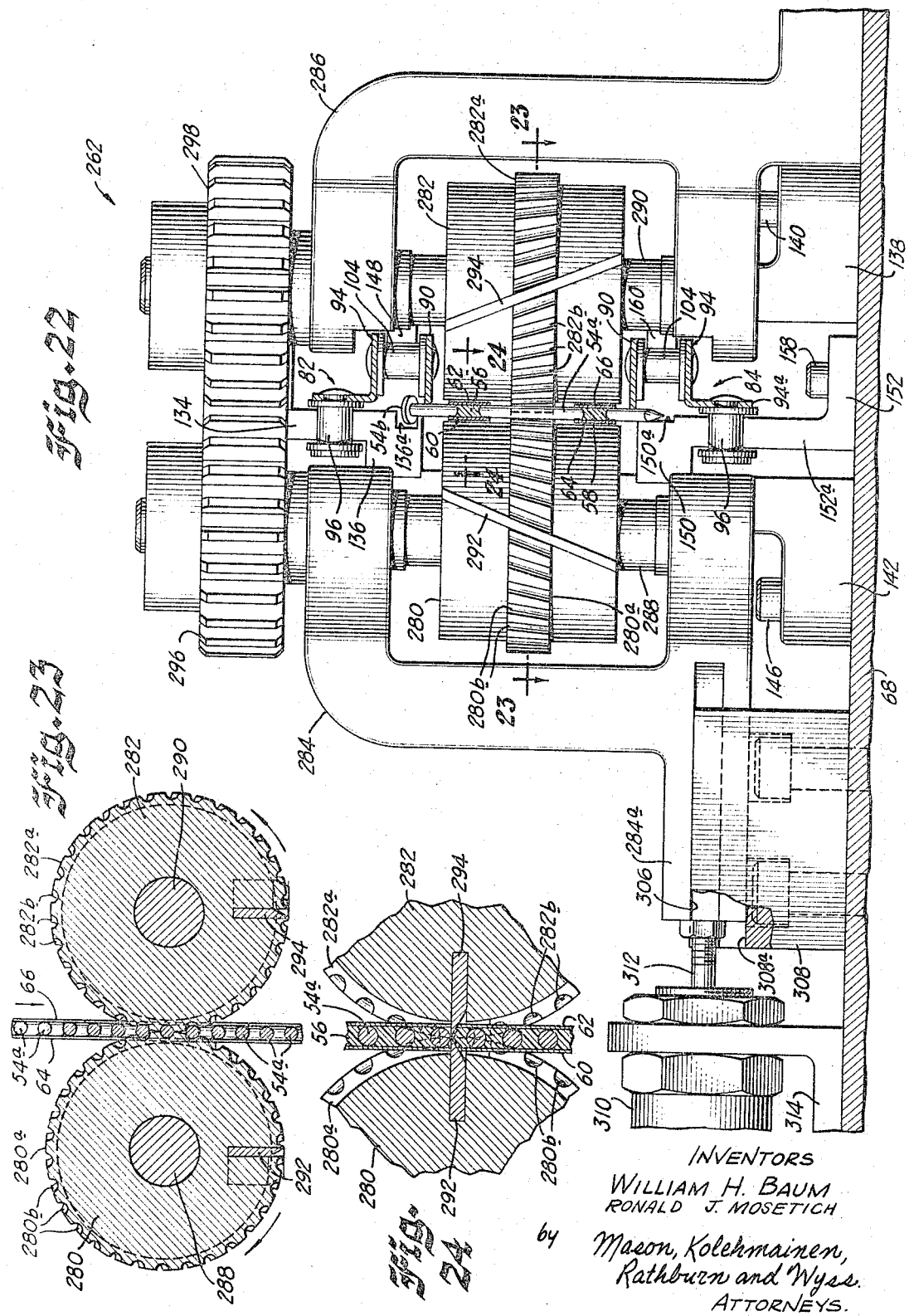

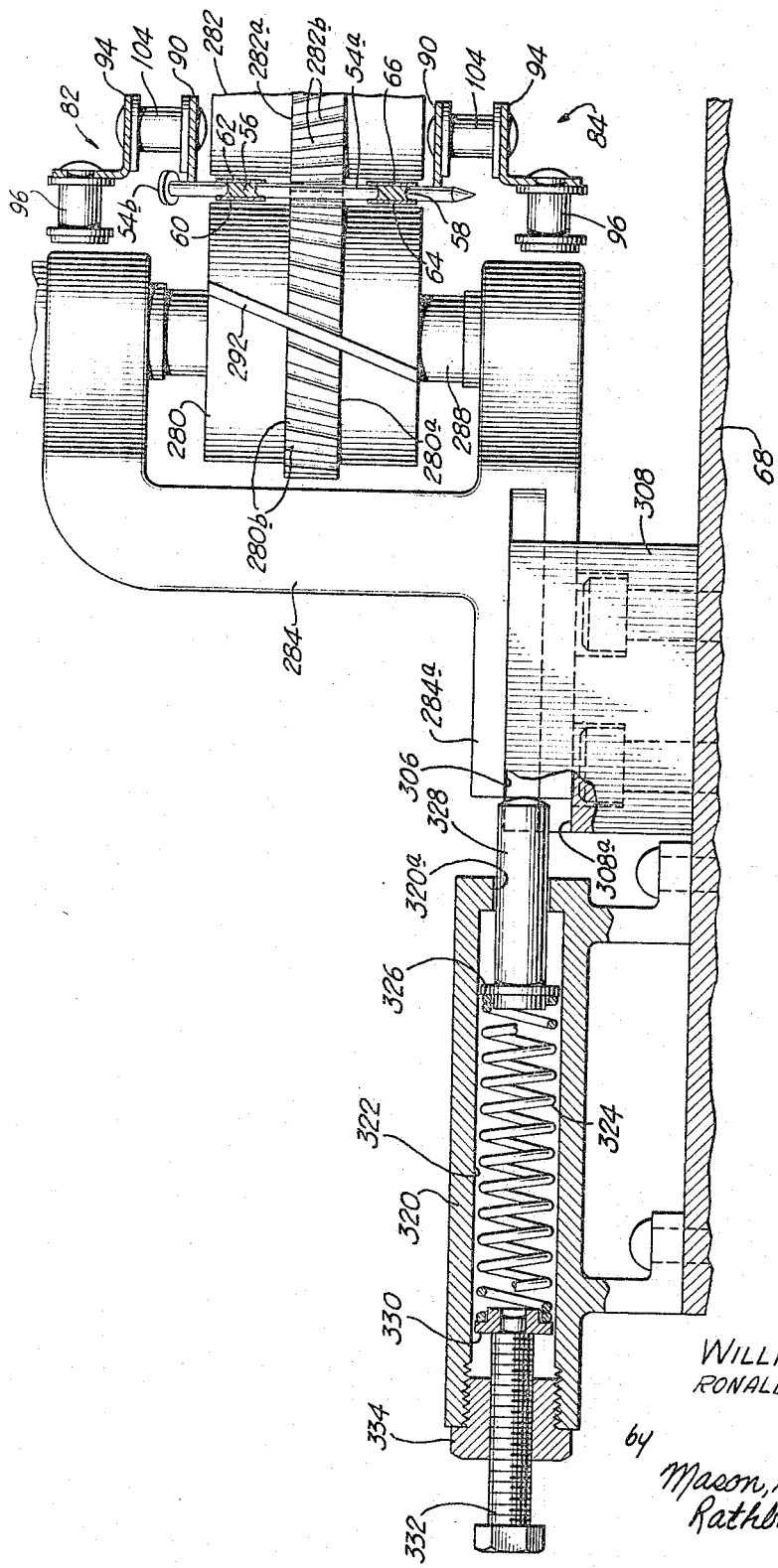

3,315,436
APPARATUS FOR AND METHOD OF MAKING
STRIPS OF NAILS
William H. Baum, Westchester, and Ronald J. Mosetich,
Lombard, Ill., assignors to Fastener Corporation,
Franklin Park, Ill., a corporation of Illinois
Filed May 11, 1964, Ser. No. 366,487
14 Claims. (Cl. 53—35)

This invention relates to an apparatus for and a method of making strips of fasteners and, more particularly, to an apparatus for and a method of making strips of flexibly joined nails having full, round heads.

The development of hydraulic and electrical motors has advanced to the point at which it is possible, in a portable tool, to develop adequate power for driving not only smaller fasteners, such as wire staples and finishing nails, but also such larger fasteners as common or cooler nails of substantial size without increasing the size and weight of the tool to the point at which it cannot be easily manipulated by hand. In a number of instances, it has been necessary to design the driving structures and magazines in these tools for use with, for instance, common nails in which the head structure is partially removed or modified. The partial removal or modification of the conventional round head of the nail introduces a number of obvious disadvantages, but it has been considered to be necessary because of an inability to design either methods or equipment capable of maintaining conventional nails in accurately spaced positions during the formation of strips of joined nails in a continuous, high speed operation. This problem is avoided but not satisfactorily solved by adopting the unsatisfactory expedient of altering the full round head of the nail to permit the shanks of adjacent nails in the strip to be placed in a contiguous abutting relationship during the strip formation as a means of controlling nail spacing and positioning.

Accordingly, one object of the present invention is to provide a new and improved apparatus for and method of making strips of fasteners.

Another object is to provide a method of making strips of nails having full heads, which method is capable of being carried on as a high speed, continuous operation using bulk nails.

Another object is to provide a method of making flexibly joined strips of fasteners in which a plastic material is applied to moving webs of flexible material and is then applied to the shanks of a moving column of fasteners to join the fasteners in a continuous strip.

Another object is to provide a method of making strips of fasteners in which a plastic material is applied to two webs of flexible material which are then fed into engagement with opposite sides of the shanks of fasteners in a moving column thereof to permit the plastic material to form a unitary body of plastic material in which the fasteners are embedded in spaced positions.

Another object is to provide a new and improved apparatus for carrying out a continuous high speed method of making strips of joined fasteners supplied from a bulk supply thereof.

Another object is to provide an apparatus for making a strip of fasteners including means for applying plastic material to a pair of flexible webs and for then moving the webs against opposite sides of a line of moving fasteners to form a unitary body of plastic material in which the fasteners are embedded.

Another object of the present invention is to provide a new and improved apparatus for making strips of fasteners.

Another object is to provide an improved apparatus for feeding fasteners and moving and supporting a plurality of fasteners in predetermined spaced positions.

Another object is to provide a new and improved apparatus for forming strips of fasteners of discrete lengths from a continuous length thereof.

Another object is to provide an improved apparatus for receiving and supporting nails in spaced inclined positions during movement on a conveying means.

A further object is to provide an apparatus for feeding nails to be supported in an inclined position on a moving conveyor.

A further object is to provide a fastener strip manufacturing machine including means for detecting faulty sections of the fastener strip.

A further object is to provide a nail strip manufacturing apparatus including means for severing discrete lengths of a nail strip from a continuous length thereof and new and improved means for controlling the effectiveness of the cutting means.

A further object is to provide a new and improved assembly for automatically cutting fixed lengths of joined fasteners from a strip thereof, which assembly also includes means for protecting the cutting means therein from injury due to bent or improperly positioned fasteners.

In accordance with these and many other objects, an apparatus and method embodying the present invention utilizes a supporting frame on which is mounted a flexible conveying means including a pair of continuously driven conveying loops which extend generally parallel to each other in vertically spaced positions. Each of the individual pivotally connected sections or links of each conveying loop carries one or more guide rollers and a structure providing a plurality of outwardly open notches for receiving the shanks of nails. To guide and stabilize movement of the conveying loops along one side thereof in which the nail strip manufacturing operations are carried out, there is provided a guide structure providing guide slots and bearing surfaces which receive or engage the rollers on the individual sections or links of the conveying means to insure movement of the conveying means along a predetermined path. This structure also includes wall surfaces disposed opposite the outwardly open notches to provide retaining means for maintaining nails supported on the notched structures in predetermined positions.

The mechanisms for forming the nail strip are disposed in spaced positions along the guided or stabilized part of the path of the conveying loops and include, when considered in the direction of movement of the conveying means, a nail feeding station for feeding nails to be supported in spaced positions on the conveying means, a strip forming section for applying plastic material on webs of flexible material to the shanks of the nails, and a severing mechanism for cutting the continuous length of previously formed nail strip into discrete segments. This severing means can be combined with detecting means for detecting faulty sections of the nail strip and for controlling the severing means to prevent injury to the cutters by the faulty sections.

The feeding station includes a bulk supply of nails from which nails are fed with their heads in an uppermost position down an inclined track to a position disposed adjacent the path of movement of the conveying means, the track being gradually inclined so that the individual nails arrive at a position adjacent the conveying means with the heads of the nails disposed rearwardly with respect to the direction of movement of the conveying means relative to the pointed end. The structures forming the wall for closing the notched sections on the conveying means are provided with two apertured portions, the upper of which is disposed rearwardly from the lower aperture when considered in the direction of movement of the conveying means. A continuously rotating and tapered feed roller biases the nails in the lower end of the track toward the conveying means and into the outwardly open notches exposed by the spaced apertures in the retaining wall structures. In this manner, individual nails are fed to and supported in inclined positions in successive pairs of notches on the upper and lower loops. As the conveying means moves each nail beyond the feeding apertures, it is positively retained in position on the conveying means during its subsequent movements.

The strip forming station comprises two pairs of rollers disposed opposite each other on opposite sides of the path of movement of the conveying means. Each of these rollers feeds a flexible strip or web of tape from a supply thereof to a position engaging the shank portion of the nails carried on the conveying means. Each of the four rollers is provided with a dispensing assembly for applying a rib, bead, or strip of plastic or resin material in a fluid, molten, or viscous state to the adjacent surface of the tape as it passes around the roller. When the two pairs of tapes are pressed against the shanks of the nails in positions opposed to each other, the plastic material is forced around the shanks of the nails and forms a unitary plastic body with the material carried on the opposed strip. During subsequent movement of the conveying means beyond the strip forming station, the plastic material becomes solidified so that the shanks of the nails are supported in integral flexible bodies of plastic material, the outer surfaces of which are covered by the tapes. If desired, the solidification of the plastic or resin material can be accelerated by blowers or suitable cooling means disposed adjacent the path of movement of the conveying means.

The final station for severing discrete lengths of the nail strip from the continuous length thereof is disposed adjacent the end of the supporting structure and includes a pair of roller means disposed on opposite sides of the conveyor loops and including grooved projecting portions bearing against the shanks of the nails between the lines along which the nails are joined. The two roller means carry inclined knife structures extending above and below the projecting portions so that as the rollers are rotated by engagement with the nails, the knives are moved into alignment to sever the plastic bodies and tapes to separate successive segments of equal lengths from the continuous length of the nail strip. To provide means for protecting the knives from faulty sections of the nail strip, one of the roller means is mounted for movement toward and away from the nail strip. A motor unit connected to the shiftable roller means is controlled by a detecting means that detects the condition of the nail strip immediately in advance of the rotating cutters. In response to the detection of an abnormality in tie strip, the movably mounted roller means is shifted away from engagement with the nail strip to disable the severing means.

Many other objects and advantages of the present invention will become apparent from considering the following detailed description in conjunction with the drawings in which:

FIG. 1 is a top plan view of a nail strip making machine embodying the present invention;

FIG. 2 is an elevational view in partial section of a strip of nails manufactured by the machine shown in FIG. 1;

FIGS. 3A–C form an enlarged top plan view similar to FIG. 1;

FIG. 4 is an enlarged sectional view taken along line 4—4 in FIG. 3A illustrating a nail feeding station;

FIG. 5 is a sectional view taken along line 5—5 in FIG. 3C illustrating a drive means for a conveying means included in the machine;

FIG. 6 is a sectional view taken along line 6—6 in FIG. 4 which illustrates the conveying means;

FIG. 7 is a sectional view taken along line 7—7 in FIG. 4;

FIG. 8 is a sectional view taken along line 8—8 in FIG. 4 showing a nail track forming a part of the nail feeding station;

FIG. 9 is a sectional view taken along line 9—9 in FIG. 7 illustrating means for feeding nails to the conveying means;

FIG. 10 is a sectional view taken along line 10—10 in FIG. 7;

FIG. 11 is a perspective view illustrating the elements of the conveying means and the manner in which nails are supported thereon;

FIG. 12 is an enlarged sectional view taken along line 12—12 in FIG. 3B illustrating a tape and plastic applying assembly included in the strip forming station;

FIG. 13 is a sectional view taken along line 13—13 in FIG. 12;

FIG. 14 is an enlarged sectional view taken along line 14—14 in FIG. 3B illustrating a nozzle assembly for applying fluid material to flexible tapes;

FIG. 15 is a perspective view of the nozzle assembly included in the strip forming station shown in FIGS. 12–14;

FIG. 16 is an enlarged sectional view taken along line 16—16 in FIG. 13 illustrating the application of the fluid material and tapes to the nails held by the conveying means;

FIG. 17 is a sectional view along line 17—17 in FIG. 16;

FIG. 18 is an enlarged sectional view taken along line 18—18 in FIG. 17;

FIG. 19 is an enlarged sectional view taken along line 19—19 in FIG. 17;

FIG. 20 is an enlarged sectional view taken along line 20—20 in FIG. 3C showing a fault detecting assembly;

FIG. 21 is a sectional view taken along line 21—21 in FIG. 20;

FIG. 22 is a sectional view taken along line 22—22 in FIG. 3C illustrating a strip severing assembly included in the nail making machine;

FIG. 23 is a sectional view taken along line 23—23 in FIG. 22;

FIG. 24 is an enlarged sectional view taken along line 24—24 in FIG. 22; and

FIG. 25 is a sectional view of a modification of the strip severing assembly.

Referring now more specifically to FIGS. 1 and 2 of the drawings, therein is illustrated a machine or apparatus 50 which embodies the present invention and which produces strips 52 containing a plurality of individual nails 54. The nails are flexibly joined together in a spaced relation in which the shanks 54a of the nails are held in inclined parallel positions with the full, round heads 54b of adjacent nails at least partially overlying each other. The individual nails 54 are secured in this position by two masses of plastic material 56 and 58 in which the shanks 54a are embedded and by four strips of flexible material or paper tape 60, 62, 64, and 66 which are disposed in pairs on opposite sides of the two bodies of plastic material 56 and 58. The strips 52 can be of any suitable length and are adapted to be driven by any suitable tool, such as the pneumatically actuated tool shown and described in detail in the copending application of Richard H. Doyle and Armin Fiedler, Ser. No. 340,863, filed Jan. 29, 1964, now Patent No. 3,253,760, which application is assigned to the same assignee as the present invention. As illustated therein, the magazine in which the strip 52 can be mounted is inclined upwardly and rearwardly from a vertically extending drive track to which the individual nails 54 are supplied in sequence by a pusher assembly. This upwardly and rearwardly inclined magazine presents the individual nails 54, which are secured in an inclined position in the strip 52, to the drive track in a vertical position suitable for driving.

The machine 50 which is mounted on a supporting frame or base 68 (FIG. 1) includes a flexible conveying assembly indicated generally as 70 which is continuously driven during operation of the machine 50 to carry nails supplied thereto from a nail orienting and feeding station or assembly 72 to a tape and plastic applying station indicated generally as 74 in which the tapes 60, 62, 64, and 66 and the plastic material forming the bodies 56 and 58 are applied to the shanks 54a of the nails 54. As the nails 54 move beyond the assembly or station 74, the plastic material, which is supplied in plastic or fluid form, solidifies to form the bodies 56 and 58, the solidification being accelerated and completed at a cooling station 76 including a plurality of air pumps or fans. The continuous length of flexibly joined nails 54 is next advanced by the conveying means 70 through a fault detecting and strip severing station 78 in which the strips 52 of predetermined length are severed from the continuous length of joined nails and discharged onto a slide 80 carried by the base 68. In this manner, nails 54 derived from a bulk supply thereof at the station 72 are joined together to form a continuous strip which is then severed and discharged as discrete nail strips 52 in a continuous high speed operation.

Conveying means 70

The conveying means 70 comprises two flexible chains or loops 82 and 84 which pass around two spaced and driven sprockets 86 (FIGS. 1, 3C, and 5) having a fixed axis of rotation and two vertically spaced idler sprockets 88 (FIGS. 1 and 3A) whose fixed axis of rotation can be adjusted to control the tension applied to the loops 82 and 84. The two conveying loops 82 and 84, which have a construction similar to that of sprocket chains, are substantially identical to each other, although reversed or inverted in position (see FIG. 11).

Each of the flexible chains or loops 82 and 84 in the conveying means 70 comprises a plurality of nail receiving or supporting plates 90 (FIG. 11) having a plurality of nail receiving notches or grooves 92 along one edge. Each of the plates 90 is secured to a right angle supporting bracket 94 having a vertically extending leg 94a on which a guide roller 96 is mounted. The nail receiving plate 90 and the roller supporting bracket 94, which form a link in one of the chains 82 and 84, are connected to each other in vertically spaced positions by two spaced pins or rivets 98 which pass through aligned holes in the plate 90 and in the horizontally extending arm 94b of the bracket 94. Successive links in the chains 82 and 84 are pivotally connected to each other by a pair of connecting plates 100 having aligned apertures 102 through which the pins 98 extend with a sleeve or bearing 104 disposed between the inner surfaces of the coupling plates 100 to maintain these plates and also the nail supporting plates 90 and brackets 94 in spaced positions. The positions of the nail receiving or supporting plates 90 and the roller supporting brackets 94 are reversed in position in the two flexible chains 82 and 84 so that the nail supporting plates 90 are disposed opposite each other with the roller supporting brackets 94 and the rollers 96 being disposed above the chain 82 and below the chain 84.

The two flexible chains 82 and 84 forming the conveying means 70 are supported and driven by the two pairs of sprockets 86 and 88 (FIGS. 1, 3A, and 3C). The pair of driven sprockets 86 includes an upper sprocket 86a (FIG. 5) whose teeth mesh with the links on the upper flexible chain 82 and a lower sprocket gear 86b whose teeth mesh with the links on the chain 84. The sprockets 86a and 86b are secured in vertically spaced positions to to a vertically extending shaft 106 whose upper end is journaled in a bearing structure 108 carried on the upper arm of a U-shaped bracket or supporting member 110 which is carried on the upper surface of the supporting frame 68. The lower end of the shaft 106 passes through a bearing structure 111 carried in an opening in the top wall of the supporting frame 68 to be coupled to a gear box or speed reducing unit 112 which is driven from a central prime mover for the machine 50 by means of a flexible belt 114 passing around a drive pulley 116.

The shaft 106 is rotated in a counter-clockwise direction (FIGS. 1 and 3C) so that the upper parts of the chains 82 and 84 move to the left and the lower parts of these chains move to the right. A pair of elongated slots 110a and 110b in the two arms of the U-shaped supporting member 110 permit the positions of the bearings 108 and 111 to be adjusted in the direction parallel to the direction of movement of the chains 82 and 84 to permit the position of the shaft 106 and the unit 112 to be adjusted. By driving the pair of sprockets 86a and 86b from a common prime mover for the entire machine, the speed at which the conveying means 70 moves is synchronized with the various operations performed at the stations 72, 74, and 78.

The flexible chains 82 and 84 are supported at the other end of the frame 68 by the pair of idler sprockets 88 including an upper sprocket 88a whose teeth engage the links of the upper sprocket chain 82 and a lower sprocket (not shown) whose teeth engage the links of the lower conveyor chain 84. The pair of sprockets 88 are secured in vertically spaced position to a vertically extending shaft 118 (FIGS. 1 and 3A) whose upper end is rotatably mounted in an upper bearing 120 carried on a generally U-shaped supporting member 122 that is substantially identical to the U-shaped supporting member 110. The lower end of the shaft 118 is rotatably mounted in a bearing (not shown) similar to the bearing 111 carried on a lower leg of the U-shaped supporting member 122. The member 122, however, is not secured in a fixed position on the frame 68 but is slidably mounted on the upper surface of this frame by a pair of guideway defining members 124 that slidably engage opposite edges of the member 122 and are secured to the upper surface of the frame 68 in opposed parallel positions. A lead screw 126 journaled in a bearing 128 that is secured to the edge of the frame or base 68 is rotatably mounted within a bushing 130 that is secured to the U-shaped supporting member 122. Accordingly, by rotating the lead screw 126, the position of the bracket 122 and the pair of idler sprockets 88 carried thereon can be adjusted to the right or to the left (FIG. 3A) in a direction parallel to the movement of the conveyor chains 82 and 84. This adjustment is useful, for example, in setting the tension applied to the chains 82 and 84.

The conveying assembly 70 also includes means for insuring proper positioning and stabilization of the individual links of the conveying chains 82 and 84 as they move past the stations 72, 74, 76, and 78. The conveying assembly 70 further includes means for insuring that the nails 54 fed to and supported on the flexible conveying chains 82 and 84 are not displaced in position. To guide and control the vertical position of the upper chain 82, a construction is provided defining a guideway or slot 132 (FIG. 4) in which are received the rollers 96 secured to the supporting brackets 94 on the chain 82. The guideway or slot 132 is defined by an upper guide rail 134 and a lower guide rail 136. A plurality of machine screws 137 secure the upper guide rail 134 to a plurality of standards 138 which are secured to the upper surface of the supporting frame 68 by a plurality of fasteners 140 at positions spaced longitudinally along the path of movement of the conveying means 70 (see FIGS. 1, 3A, and 3B). The lower guide rail 136 is secured to the upper ends of a plurality of supporting standards 142 by a plurality of headed fasteners 144. The standards 142 are secured to the upper surface of the base 68 by a plurality of headed fasteners 146 at positions spaced along the path of movement of the conveying means 70 and on the opposite side thereof from the standards 138. The standards 138 and 142 and the rails 134 and 136 are so constructed and arranged as to provide substantially continuous guiding surfaces for the rollers 96 in the upper conveying chain 82 from a position disposed in advance of the nail aligning and feeding station 72 (FIGS. 1 and 3A) to a position disposed adjacent the strip severing station 78 (FIGS. 1 and 3C).

To provide means for guiding and controlling transverse deflection or movement of the upper conveying chain 82 and to insure the retention of the nails 54 on the nail supporting plates 90 in the upper chain 82, a guide rail 148 is secured to the spaced standards 138 in a poistion adapted to bear against the outer periphery of the rollers or sleeves 104 (FIG. 4) in the chain 82. Engagement between the rollers 104 and the rail 148 prevents deflection of the upper chain 82 to the right (FIG. 4). Cooperating with the rail 148 is a recess 136a in which the heads 54b of the nails 54 carried on the chain 82 are received. The positioning of the rails 136 and 148 is such that sliding engagement between the lower wall defining the recess 136a and the shanks 54a of the nails 54 biases the nail shank against the inner end of the notch or opening 92 in the nail supporting plates 90. In this manner, the guide rail 136 effectively closes the open ends of the notches 92 in the nail supporting plates 90 to insure the retention of nails 54 on the conveying means or chain 82.

Similar means are provided for guiding movement of the conveying chain 84 and for insuring the retention of the nails 54 in the notches 92 on the nail supporting plates 90 on this chain. More specifically, this structure includes a pair of guide rails 150 and 152 which define a guideway or slot 154 for receiving the rollers 96 on the lower chain 84. The upper guide rail 150 is secured to an intermediate portion of the supporting standard 142 by a plurality of fasteners 156, and the lower guide rail 152 includes a flanged lower wall 152a that is secured to the base 68 by a plurality of headed fasteners 158. The slot or guideway 154 cooperates with the slot or guideway 132 to insure that the chains 82 and 84 are maintained in proper vertically spaced positions. An additional guide rail 160 secured to the standards 138 includes an inner surface bearing against the rollers or sleeves 104 on the chain 84. This engagement insures the correct transverse position of the individual links of the chain 84. A recessed portion 150a formed adjacent the upper end of the rail 150 is adapted to receive the pointed ends of the shanks 54a of the nails 54 and insures that the lower ends of the shanks 54a are retained within the lower ends of the nail receiving slots or notches 92 in the nail supporting plates 90 in the lower chain 84. Thus, the guide rail 150 effectively closes the open ends of the notches 92 in the plates 90 on the lower chain 84 during movement of this chain through the work performing stations of the machine 50.

*Nail aligning and feed station 72*

The nail aligning and feeding station 72 (FIGS. 4, 6–10) is disposed adjacent the left-hand end of the guided and stabilized portion of the path of movement of the flexible conveying means 70 and operates to separate individual nails 54 from a bulk supply therof and feed these nails to successive ones of the notches or openings 92 on the links of the conveying means. The nail aligning and feeding assembly or station 72 includes means indicated generally as 162 (FIG. 1) for receiving bulk nails, for separating these nails, and for feeding these nails into a track or raceway indicated as 164 which transports the nails to the conveying means 70.

The raceway or track structure 164 comprises a pair of plates 166 and 168 (FIG. 8) which are secured together in face-to-face abutting relation so that a T-shaped opening 170 is formed by adjacent surfaces of the plates 166 and 168 in which the nails are received aligned in a column with the heads 54b of the nails resting on a pair of surfaces indicated as 166a and 168a. The raceway 164 extends substantially vertically immediately adjacent the assembly 162 and is tapered or gradually turned about its length as it approaches the conveying means 70 (see FIG. 1) so that the lower or pointed end of the shanks 54a are moved in advance of the heads 54b at a position immediately adjacent the conveying means 70. The forward ends of the plates 166 and 168 are provided with shouldered portions, such as a shouldered portion 168b illustrated in FIG. 4, which are inserted between the guide rails 136 and 150 in a position in which the opening 170 in the track assembly 164 is disposed in alignment with a pair of openings 172 and 174 in the rails 136 and 150, respectively (FIGS. 7, 9, and 10). Because of the downwardly and forwardly inclined position of the track or raceway assembly 164, the opening 174 communicates with the successive notches or openings 92 on the plates 90 of the lower chain 84 that are positioned forwardly, considered in the direction of movement of the conveying means 70, relative to the notches or openings 92 on the plates 90 of the conveying chain 82 that are concurrently aligned with the head receiving opening 172 (see FIG. 7). The track assembly 164 is supported on the base 68 by means of a supporting bracket 176 (FIG. 4) which is secured at its lower end to the base 68 by a plurality of fasteners 78 and to the wall 168 of the assembly 164 by a plurality of fasteners 180.

Although the nails 54 would probably slide down the track 164 with the heads 54b sliding over the surfaces 166a and 168a so as to feed successive nails to the conveying means 70, the nail station 72 includes positively driven means for biasing the lowermost group of nails within the opening 170 toward the conveying means to be disposed in and carried off by successive notches 92 in the plates 90. This positive feeding means comprises a resilient pressure roller 182 (FIGS. 7 and 9) having a generally truncated conical configuration with tapered or triangular ribs formed in its outer periphery. The roller 182 is secured to a shaft 184 that is rotatably mounted between two arms 186a and 186b of a bifurcated supporting structure 186 suitably secured to the supporting frame 68. The outer periphery of the resilient roller 182 extends into the opening 170 in the track assembly 164 through an opening 188 in the wall member 166. The taper of the roller 182 is such that its outer periphery extends substantially parallel to the shanks 54a of the adjacent nails 54 in the track assembly 164 (FIG. 7).

When the nail aligning and feeding station is placed in operation, a drive means connected to the shaft 184 is rendered effective to continuously rotate the resilient drive roller 182, and the separating and feeding means 162, which can be of any of the known structures utilizing, for instance, a vibrating separator and feeder, advances a series of nails 54 from the bulk supply thereof into the track assembly 164 with the heads 54b of the nails resting on the surfaces 166a and 168a in the recess 170. These nails move downwardly by sliding engagement between the heads 54b and the engaged surfaces until the first nails reach the lower end of the track assembly 164. At this time, the lower ends of the shanks 54a are engaged by the rotating roller 182 and forced to the right (FIG. 9) toward the belts 82 and 84 of the conveying means. As additional nails are supplied by the track assembly 164, the lowermost nails engaged by the resilient roller 182 are biased to the right in the manner shown in FIG. 9 so that the head 54b of each nail is biased into engagement with the shank of the adjacent nail and the pointed ends of the shanks 54a of all of the nails are biased against each other. The innermost nail 54 approaches a vertical position although inclined in the manner illustrated in FIG. 7. This innermost nail is received in the two notches 92 aligned with the openings 172 and 174 and is carried on the chains 82 and 84. As each nail is carried away, the resilient roller 182 biases the next adjacent nail in the opening 170 into a feeding position in which it is disposed in the next adjacent pair of recesses 92 in the nail supporting plates 90 on the chain conveyors 82 and 84. As each nail 54 is carried away by the conveying means 70, the remaining nails 54 in the track assembly 164 advance the length of one nail, and the lower end of the shank of the next adjacent nail 54 is engaged by the resilient roller 82 and driven toward the outlet end of the opening 170. In this manner, a continuous supply of biased nails, shown in FIG. 9 as twelve nails, is provided by the resilient roller 182. Because of the resilient construction of the roller 182, the outer periphery of this roller can move over the engaged surfaces of the nails 54, and the machine 50 does not require synchronized movement between this roller and the conveyor 70.

As illustrated in FIGS. 6 and 7 of the drawings, the inclination of the track structure 164 relative to the conveyor chains 82 and 84 is such that there is a pitch of approximately four notches 92 between the point on the chain 82 at which the upper shank or head 54b of a given nail 54 is engaged and the point at which the pointed end of the shank is engaged by the conveyor 84. In other words, considered relative to the direction of movement of the conveying means 70, the notch 92 in the conveyor chain 84 receiving the shank 54a of a given nail is positioned four notches in advance of the slot 92 in which the shank portion adjacent the head 54b of the same nail is received. As the chains 82 and 84 move beyond the nail supplying or feeding station, the shank 54a of each nail moves beyond the feed openings 172 and 174 and into engagement with the surfaces of the recesses 136a and 150a in the rails 136 and 150. These surfaces hold the shanks 54a of the nails against the inner walls of the notches 92 in the plates 90 in both of the conveyor chains 82 and 84 (see FIG. 4) to prevent inadvertent discharge of the nails from these conveyors.

*Tape and plastic applying station 74*

The tape and plastic feeding and applying station 74 (FIGS. 1, 3B, and 12–19) includes means for applying the four strips of paper tape 60, 62, 64, and 66 and the plastic material forming the bodies 56 and 58 to spaced positions on the shanks 54a of the nails 54 carried on the conveying means 70 during movement of these nails from left to right in FIGS. 1 and 3B of the drawings. In general, the station or assembly 74 includes means for supplying four separate strips of paper tape, two on each side of the path of movement of the conveying means 70 spaced vertically from each other. Just prior to the application of the tapes to the shanks 54a of the nails 54, a bead, ribbon, or strip of plastic material in molten or fluid state is applied to these tapes so that when the tapes are applied to the nails 54, the beads of plastic material are united to provide the plastic bodies 56 and 58 in which the shanks of the nails are embedded.

To provide means for supplying the tapes 60, 62, 64, and 66, two tape supply reel assemblies 190 and 192 (FIGS. 1 and 3B) are provided secured to and positioned adjacent opposite longitudinal edges of the supporting frame 68. The assembly 192 provides the two tapes 62 and 66 in vertically spaced positions while the assembly 190 supplies the tapes 60 and 64 in vertically spaced positions. The tapes 60, 62, 64, and 66 supplied by the assemblies 190 and 192 are fed into engagement with the shanks of the moving nails 54 by two substantially identical assemblies disposed on opposite sides of the path of movement of the conveying means 70. Each of these assemblies includes an arm 194 that is pivotally mounted on the base or frame 68 by a shaft 196 carried in a standard or support 200 that is secured to the upper surface of the base 68 by a plurality of fasteners 202. A shaft 207 (FIG. 14) on the outer or free end of each of the arms 194 rotatably supports an upper roller 204 (FIGS. 12 and 13) and a lower roller 206 around which the tapes 60 and 64 or 62 and 66 pass. To guide movement of these tapes from the supply assemblies 190 and 192 to the rollers 204 and 206, a pair of tape guide tubes 208 and 210 are provided. The tubes 208 and 210 are held in spaced parallel notches or recesses in a supporting plate 212 by a clamping plate 214 that is removably held in position by a fastener 215 threadedly engaged in the plate 212. The supporting member or plate 212 is secured to a pair of oppositely extending L-shaped brackets 216 and 218 by a plurality of threaded fasteners 220 and 222. The horizontally extending legs of the brackets 216 and 218 are provided with longitudinally extending slots, such as the slot 224 (FIG. 3B) in the leg of the bracket 216, to receive a machine screw 226. By loosening the machine screws 226, the position of the paper guide tubes 208 and 210 relative to the supporting arms 194 can be adjusted.

The position of the arms 194 as well as the pressure with which the tapes 60, 62, 64, and 66 are biased against the shanks 54a of the nails 54 carried on the conveying means 70 can be adjusted by a machine screw 230 (FIGS. 3B and 12) having an outer end which bears against the side of the lever or arm 194. An intermediate portion of the adjusting screw 230 is threadedly received within a support 232 secured to the upper surface of the base or supporting frame 68. By adjusting the position of the screw 230, the levers 194 can be biased toward the conveying means.

The station or assembly 74 also includes means for supplying a rib or bead of fluid or molten plastic material to each of the tapes 60, 62, 64, and 66 prior to the time in which these tapes are pressed against the shanks 54a of the nails 54 carried by the conveying means 70. This plastic material preferably comprises a thermoplastic material which is heated in suitable temperature controlled means (not shown) to place it in a fluid or molten condition. The plastic or thermoplastic material preferably comprises a polyester base "hot melt" material that is applied in a fluid or molten state at a temperature around 300° F. This material is resistant to cracking or embrittlement to temperatures below −15° F. and does not soften or become tacky at temperatures as high as 170° F. This molten or fluid thermoplastic or resin material is conveyed from the heating and storage means, which can be common to both tape applying assemblies, to two identical nozzle assemblies indicated generally as 234 (FIGS. 3B, 14, and 15) by conduit means 236 (FIG. 14) supplied with an insulating or heating jacket 238. Each of the nozzle assemblies 234 is secured to one end of an L-shaped bracket 240 by a plurality of headed fasteners 242 (FIG. 14). The lower end of each of the brackets 240 is slotted and secured in an adjusted position on the base 68 by a machine screw 244 (FIG. 3B).

Each of the nozzle assemblies 234 applies a bead of the molten or viscous plastic material to each of the two tapes supplied to each side of the shanks of the nails 54. More specifically, the nozzle assembly 234 includes a housing 246 having a pair of outlets or ports into which are threaded a pair of nozzle elements 248 and 250. Each of the nozzle elements 248 and 250 includes an axially extending bore or passage 248a or 250a communicating with a transversely extending opening or notch 248b or 250b at its outer end. The openings 248b and 250b extend in the direction of movement of the adjacent tapes 60 and 62 or 64 and 66. The nozzle assemblies 234 are positioned with the ends of the nozzle elements 248 and 250 engaging the outer surfaces of the tapes 60, 62 and 64, 66, respectively, in positions opposite the rollers 204 and 206, respectively. As the tapes 60, 62, 64, and 66 are pulled past the nozzles 248 and 250 of the nozzle assemblies 234, a bead, rib, or elongated mass of the plastic material is applied to the outer surfaces of these tapes as illustrated in FIGS. 12, 13, and 16 of the drawings.

When the machine 50 is placed in operation, the four paper tapes of flexible webs 60, 62, 64, and 66 are withdrawn from the supply reel assemblies 190 and 192, and the ends of these tapes are advanced through the proper ones of the tape guides 208 and 210 to pass around the outer peripheries of the rollers 204 and 206 so that the ends can be inserted between the peripheries of these rollers and the adjacent portions of the shanks 54a of the nails 54 carried on the conveying means 70. The supply receptacle (not shown) of fluid "hot melt" or resinous material supplies this material through the conveying means 236 and the cavities in the housing 246 to the two pairs of nozzles 248 and 250. When the conveying means 70 is placed in operation, the pressure of the rollers 204 and 206 against the adjacent nail shanks 54a with the paper tapes 60, 62, 64, and 66 interposed therebetween causes movement of the tapes with the nails 54 on the conveyor so that tape is withdrawn from the supply reel assemblies 190 and 192. As these tapes pass around the peripheries of the rollers 204 and 206, the fluid or viscous plastic or resin material is withdrawn from the nozzle elements 248 and 250 through the openings 248b and 250b to apply beads, ribbons, or strips of the plastic material to the tapes. As an example, in FIG. 16 of the drawings, the two nozzle elements 248 are shown as applying two beads or ribs identified as 56a and 56b of plastic material to the tapes 60 and 62 during their movement around the pair of upper guide rollers 204.

As the conveying means advances the column or line of nails 54 into the page in FIG. 13 or upwardly in FIG. 16 or to the right in FIG. 12, the tapes 60, 62, 64, and 66 are fed inwardly toward the shanks 54a of the nails and, in doing so, the tapes force the four beads or ribs of plastic material against the nail shanks to form the bodies 56 and 58 of plastic material in which the nails 54 are embedded. As an example, the two ribs or beads of plastic material 56a and 56b (FIG. 16) carried on the tapes 60 and 62 are moved inwardly and forced into engagement with opposite sides of the shanks 54a of the nails as the tapes 60 and 62 are advanced in engagement with the nails carried on the moving conveyor 70. The two elongated strips or masses 56a and 56b of material are forced together in the spaces between the shanks 54a on adjacent nails 54 to form the unitary body of plastic material 56 in which these nails are embedded.

To provide means for insuring that the bodies 56 and 58 are integral bodies coextensive with the length of nail strip 52 and to prevent them from becoming a series of disconnected or discontinuous bodies interposed between adjacent nail shanks 54a, the outer peripheries of the rollers 204 and 206 are provided with recessed areas or grooves 204a and 206a (FIGS. 14, 16, 18, and 19) which are disposed generally in the same area in which the beads 56a and 56b of plastic material are applied by the nozzles. When the rollers 204 and 206 press the tapes 60 and 62, 64 and 66 against the nail shanks 54a, the recessed areas 204a and 206a (FIG. 18) permit the plastic material 56 or 58 to displace the flexible webs or paper tapes 60, 62, 64, and 66 into the recesses 204a and 206a to leave a thin layer of plastic material surrounding the shank 54a of the nail and connecting the mass of plastic material disposed between the shanks of a given pair of nails with the masses of plastic material disposed in the spaces between the adjacent nails. The bodies of plastic material 56 and 58 also adhere to the flexible webs or tapes 60, 62, 64, and 66.

As the nails 54 together with the applied bodies of plastic material 56 and 58 and the adhered tapes 60, 62, 64, and 66 travel from the station 74 toward the station 76 (FIGS. 1, 3B, and 3C), the metal bodies of the nails 54 remove heat from the heated plastic or resin material so that it tends to solidify. If desired, the speed of movement of the conveying means 70, as well as the distance of travel between the station 74 and the severing station 78, can be designed to permit the solidification of the plastic material before the station 78 is reached. However, the speed of operation of the machine 50 can be substantially increased by providing positive cooling means to accelerate the solidification of the plastic bodies 56 and 58. Although the cooling means provided at the station 76 can be of any suitable construction, the illustrated means (FIGS. 1 and 3C) comprise a plurality of motor driven air impelling means or blowers 252, 254, and 256 which discharge a stream or moving body of air in a direction substantially transverse to the direction of movement of the conveying means 70 to accelerate the removal of heat from the plastic bodies 56 and 58 and their solidification.

*Fault detecting and severing station 78*

The station or assembly 78 includes both a detecting assembly 260 (FIGS. 20 and 21) for detecting a faulty section in the continuous length of joined nails 54 and a severing assembly 262 (FIGS. 22–24) for separating or severing discrete lengths of the continuous length of joined nails manufactured by the machine 50. Although the fault detecting means 260 can be used to control any desirable type of equipment for marking or removing faulty sections, it is used in the machine 50 to control the severing assembly 262.

The fault detecting assembly or means 260 included in the station 78 (FIGS. 3C, 20, and 21) includes a roller or wheel 264 that is rotatably mounted on one end of an arm or lever 266 by a shaft 267. The lever 266 is pivotally mounted on the base or frame 68 intermediate its ends by a stub shaft or pin 268 carried on a supporting member 270. The wheel 264 has a plurality of inclined grooves 264a on its outer periphery whose inclination corresponds to the inclination of the shanks 54a of the nails 54 carried on the conveying means 70. The other end of the lever 266 bears against an operating plunger 272 of a switch 274 that is secured to an L-shaped supporting bracket 276 by a plurality of headed fasteners 278. The bracket 278 is secured to the supporting frame 68.

The operating plunger or stem 272 of the switch 274 is resiliently biased to the position shown in solid line in FIG. 2 to pivot the lever 266 in a clockwise direction about the shaft 268 (FIG. 21) so that the wheel or roller 264 is biased into engagement with the shanks 54a of the joined nails 54 in a position disposed between the tapes 60, 62, and 64, 66. The shanks 54a of the nails are normally received within the grooves 264a on the roller 264 so that as the joined nails 54 are advanced by the conveying means 70, the roller 264 is rotated about the axis of the shaft 267. However, if a nail 54 has been joined to adjacent nails in a skewed or non-parallel relation with the adjacent nails in the strip or if a nail 54 is bent, the shank of this nail will not be received within one of the equally spaced grooves 264a but will engage the outer periphery of the roller 264.

When this happens, the roller 264 is deflected to the right (FIG. 21) to pivot the lever 266 in a counterclockwise direction about the shaft 268 from the position shown in solid line to the position shown in dot-and-dash outline. This movement depresses the plunger 272 to operate the switch 274. The operation of the switch provides an indication that the nail then engaged by the roller 264 is not disposed in a symmetrical relation and is either bent or secured to the strip in a faulty manner. The indication provided by the actuated switch 274 can be used to control any suitable control means and is illustrated in the machine 50 as modifying the operation of the strip severing assembly 262. As the faulty section of nails 54 passes by the roller 264, the shanks 54a return to a position disposed within successive grooves 264a in the roller 264, and the lever 266 is pivoted in a clockwise direction about the shaft 268 to the position shown in solid line in FIG. 21 to release the switch 274.

The cutting or severing assembly 262 (FIGS. 22–24) severs the strips 52 of discrete length from the continuous length of joined nails manufactured by the machine 50. It also includes means for retracting or discharging the cutting means when a displaced or bent nail is included in the strip to prevent damage to the cutter elements.

The assembly 262 includes a pair of cutter wheels or rollers 280 and 282 which are rotatably mounted on a pair of supporting brackets or standards 284 and 286 by a pair of shafts 288 and 290. The rollers or wheels 280 and 282 each include a centrally located and projecting peripheral portion 280a and 282a in which are formed a plurality of inclined grooves 280b and 282b. The grooves 280b and 282b are inclined the same as the shanks 54a of the joined nails 54.

The rollers or wheels 280 and 282 also each carry an inclined or diagonally extending cutter element or knife 292 and 294 whose outer cutting edge is substantially flush with the projecting portions 280a and 282a and projects above the remaining surfaces on the wheels or drums 280 and 282. The inclination of the cutters 292 and 294 is the same as the inclination of the nails 54, and the position of the cutting elements 292 and 294 relative to the grooves 280b and 282b in the projecting portions 280a and 282a is such that the cutting elements 292 and 294 fall in a space disposed between adjacent joined nails 54. A pair of meshing gears 296 and 298 secured to the upper ends of the shafts 288 and 290 synchronize the rotation of the drums or wheels 280 and 282 so that the cutters 292 and 294 always remain in positions in which they would be moved into abutting or aligned relationship once during each cycle of rotation of these two rollers.

In operation, the flexible chains 82 and 84 of the conveying means 70 pass between the supporting standards 284 and 286 of the assembly 262 at a position spaced beyond the ends of the guide rails 134, 136, 148, 150, 152, and 160 so that the flexibly joined strip of nails 54 passes between the nip of the rollers 280 and 282 with the shanks 54a of successive nails being received within the successive slots or grooves 280b and 282b in the projecting portions 280a and 282a. This engagement of the projecting portions 280a and 280b by the shanks 54a of the nails 54 causes the conveying means 70 to operate as a drive means for rotating the rollers 280 and 282 and the gears 296 and 298. This driving engagement between the rollers or wheels 280 and 282 and the shanks 54a of the nails 54 is illustrated in FIG. 23 of the drawings.

To provide means for severing a predetermined length or strip 52 of the flexibly joined nails from the continuous length thereof, the knives 292 and 294 are moved in aligned engagement with the strip in the area joined by the tapes 60, 62, 64, and 66 and the plastic bodies 56 and 58 once during each cycle of rotation of the rollers 280 and 282. As illustrated in FIG. 24 of the drawings, the knives 292 and 294 move into engagement with the continuous length of flexibly joined nails to sever the tapes 60, 62, 64, and 66 and the plastic bodies 56 and 58 to separate the leading portion of the continuous length of joined nails from the remainder thereof. Since the cutting or severing assembly 262 is positioned beyond the end of the guide rails, such as the guide rails 136 and 150, the joined strip of nails is retained on the chains 82 and 84 of the conveying means 70 only by the engagement of the shanks 54a with the notches 92 in the nail supporting plates 90. Thus, when the continuous length is severed by the knives 292 and 294, the portion of the flexibly joined length of nails disposed to the right of the knives 292 and 294 (FIGS. 1 and 3C) is free to be discharged from the machine 50.

To assist the ejecting or discharging operation, a deflecting blade or arm 300 is secured at one end to a bracket 302 carried on the frame 68 of the machine 50. The other end of the deflecting or separating blade 300 extends between the flexible chains 82 and 84 in the path of movement of the joined strip of nails. As each leading edge of the strip 52 emerges from between the rollers 280 and 282, it engages the deflecting blade 300 and is displaced onto the downwardly inclined chute or slide 80 carried on the frame 68 of the machine 50. When the knives 292 and 294 sever a continuous length of the flexibly joined nails in the manner described above, the leading portion falls onto the slide 80 and is ejected from the machine 50 for inspection at a packing table.

As indicated above, the severing assembly 262 is automatically controlled by the fault detecting assembly 260 to prevent any possible damage to the cutter blades 292 and 294 in the event that bent nails or poorly positioned nails are included in the continuous length of joined nails manufactured by the machine 50. To accomplish this, the standard 286 on which the wheel 282 is rotatably mounted by the shaft 290 is secured in a fixed position on the supporting frame 68. However, the standard 284 on which the wheel 280 is rotatably mounted by the shaft 288 is mounted for sliding movement relative to the supporting frame 68. More specifically, a base portion 284a of the supporting standard 284 includes a pair of opposed slots or guideways 306 formed in its opposite edges in which are slidably received projecting portions on a guide means 308 that is secured to the upper surface of the frame 68. The lower wall of the projection 284a on the standard 284 is slidably mounted on the upper surface 308a of the structure 308. A pneumatic or hydraulic cylinder 310 is secured to the outer end of the projecting portion 284a by a connecting rod 312, the cylinder 310 being secured to the frame 68 by an L-shaped supporting bracket 314.

In operation, the standard 284 normally occupies the position illustrated in FIG. 22 in which both of the projecting portions 280a and 282a engage the shanks 54a of the flexibly joined nails. However, whenever the assembly 260 detects the presence of a bent nail in the length of joined nails or an improperly positioned nail so that the switch 274 is actuated, a pressurized fluid is supplied to the cylinder 310 to retract the connecting rod 312 so that the standard 284 slides to the left on the guide or supporting structure 308. The standard 284 moves far enough to the left that the projecting portion 280a is moved out of engagement with the shanks 54a of the nails. This movement prevents engagement of the cutter blade 292 with a bent or out of position nail. Further, although the cutter blade 294 might be moved into engagement with the nail, the retracted position of the roller 280 permits the strip to deflect so that there is no possibility that the cutting edge of the knife 294 will be damaged.

Although the switch 274 is only momentarily operated in response to the deflection of the roller 264 and the lever 266 in the assembly 260, the hydraulic cylinder 310 can be provided with adjustable time delay means, such as a dashpot, for retarding its return after the release of the switch 274. This delay period is sufficient to permit any bent or incorrectly positioned nails to pass beyond the nip of the rollers 280 and 282. After this time delay, a resilient biasing means or the cylinder 310 moves the standard 284 to the right to a position in which the shanks 54a of the nails are again received in the grooves 280b in the projecting portion 280a on the roller 280.

The knives 292 and 294 are held in synchronized positions so that they will be moved into alignment to perform the severing operation by forming the teeth on the gears 296 and 298 of such length that when the bracket 284 is retracted, the gears 296 and 298 remain in engagement. Thus, whenever the bracket 284 is retracted so that the roller 280 is not rotated by engagement with the shanks 54a of the nails, the roller 282 is rotated by engagement with the moving strip of nails and is effective through the meshed gears 296 and 298 to produce a corresponding rotation of the wheel 280. In this way, the knives 292 and 294 remain in proper positions relative to each other so that when the supporting standard 284 is returned to its normal position to again place the roller 280 in driving engagement with the moving nail strip, the knives 292 and 294 are in a position in which they advance into concurrent cutting engagement with the strip.

FIGURE 25 of the drawings illustrates an additional means for automatically permitting shifting movement of the standard 284 to prevent damage to the cutter bars or blades 292 and 294 resulting from a badly positioned or bent nail in the strip of joined nails. In the embodiment illustrated in FIG. 25, the supporting standard 284 is slidably supported on the frame 68 by the structure 308 in the manner described above. However, in place of the fluid cylinder 310 which was connected to the projection 284a on the standard 284 by the rod 312, a generally cylindrical housing 320 is provided having an axial opening 322 in which is disposed a compression spring 324. The forward end of the compression spring bears against a washer or disc 326 secured to one end of a plunger 328, the outer end of which passes through an end opening 320a in the housing 320 to bear against the end of the projection 284a on the standard 284. The other end of the compression spring 324 bears against a plate or disc 330 disposed in the opposite end of the recess 322. A lead screw 332 threadedly mounted within a member 334 carried in an opening in the outer end of the housing 320 bears against the disc 330 and can be adjusted to vary or control the resilient pressure applied by the compression spring 324 to the plunger 328.

The compression spring 324 is normally effective through the plunger 328 to bias the standard 284 to the right-hand or normal position illustrated in FIG. 22 of the drawings in which the shanks 54a of the joined nails are received within the grooves 280b. Whenever a faulty section of the continuous length of joined nails moves into the nip between the rollers or wheels 280 and 282 and is so positioned as to cause one or the other of the knives 292 and 294 to move into engagement with one of the nails rather than portions of the plastic bodies 56, 58 or paper tapes 60, 62, 64, and 66 positioned therebetween, the continuing rotation of the wheels 280 and 282 forces the knives 292 and 294 against the metal of the nail shanks 54a. This would tend to injure these knives. However, because the supporting standard 284 is not rigidly secured to the frame 68, the deflecting force produced when the knives engage metal shifts the bracket 284 to the left against the bias of the compression spring 324 until such time as the bent or poorly positioned nail has moved beyond the nip between the rollers 280 and 282. At this time, the bracket 284 is shifted to the right to its normal position by the force applied to the projecting portion 284a of the standard 284 through the plunger 328. In this manner, the cutting knives 292 and 294 on the rollers 280 and 282 are protected without requiring the provision of a detecting assembly, such as the assembly 260.

Although the present invention has been illustrated with respect to a number of embodiments thereof, it should be understood that numerous other modifications and embodiments can be devised by those skilled in the art that will fall within the spirit and scope of the principles of this invention.

What is claimed and desired to be secured by Letters Patent of the United States is:

1. A method of making a strip of fasteners having a shank portion, which method comprises the steps of
   arranging the fasteners in alignment with the shanks extending generally parallel to and spaced from each other,
   moving the aligned fasteners along a predetermined path,
   feeding a length of flexible material into contact with the shanks of the fasteners at a given point in their path of movement to move with the fasteners,
   applying a mass of fluid plastic material to the length of flexible material at a position disposed in front of the given point considered with respect to its path of movement so that the mass of fluid material is applied to the shanks of the fasteners by the length of flexible material,
   and solidifying the fluid material during movement of the fasteners to join the fluid material and the flexible material to the fasteners to form a strip thereof.

2. A method of making strips of headed fasteners having shanks, which method comprises the steps of
   separating fasteners from a jumbled mass thereof and moving the separated fasteners along a fixed path of movement with the individual fasteners disposed adjacent each other,
   applying two lengths of a flexible medium to the shank of the fasteners on opposite sides thereof, the lengths of flexible material moving along the path of movement with the fasteners,
   applying an elongated mass of fluid material to each of the lengths of flexible material prior to application of the lengths of flexible material to the shanks, the fluid material on the opposed lengths of flexible material forming a single body of fluid material embracing the shank portions of the moving fasteners,
   and solidifying the fluid material during movement along the path to join the fasteners in an elongated strip.

3. A method of making a strip of headed fasteners having shanks, which method comprises the steps of
   separating individual fasteners from a mass of jumbled fasteners and moving the separated fasteners along a path with the heads of the individual fasteners overlapping each other and with the shanks spaced from each other,
   withdrawing at least two lengths of flexible material from a supply thereof,
   applying a continuous strip of fluid thermoplastic material to each of the lengths of flexible material,
   moving the two lengths of flexible material against the shanks of the moving fasteners in positions opposite each other to force the two strips of fluid material into engagement with the shanks and with each other, the two strips of fluid material forming a single length of fluid material in which the shanks of the fasteners are received,
   and cooling the thermoplastic material during movement of the fasteners along the path to join the separated fasteners into a flexible strip.

4. An apparatus for making strips of headed fasteners comprising
   conveying means for feeding a plurality of aligned and spaced fasteners along a predetermined path,
   web feeding means disposed on opposite sides of the path for feeding flexible web material to positions adjacent the moving fasteners,
   means for applying a strip of plastic material to the web material,
   means for feeding the web material carrying the plastic material against opposite sides of the moving fasteners and for forcing the plastic material between the spaced fasteners an amount sufficient to merge the two strips of plastic material into a single body of plastic material containing the fasteners,
   and means disposed adjacent the path of movement of the fasteners beyond the point of application of the web material for solidifying the plastic material.

5. An apparatus for making a strip of fasteners having shanks comprising
   conveying means movable along a given path and including fastener supporting means,
   fastener feeding means disposed adjacent a given point in the path of movement of the conveying means for feeding fasteners to the conveying means to be engaged by the supporting means and held in positions with the shanks spaced from each other,
   a pair of plastic material dispensing assemblies disposed adjacent opposite sides of the conveying means spaced from the fastener feeding means in the direction of movement of the conveying means, a pair of web feeding means disposed on opposite sides of the conveying means, each of said web feeding means feeding a length of web material past the plastic material dispensing assemblies to receive a coating of fluid plastic material and feeding the coated side of the web against the shanks of the moving fasteners, said web feeding means also feeding the coated surfaces of the web against the shanks of the fasteners in positions transversely aligned with each other with respect to the direction of movement of the conveying means so that the coatings on the two webs are united in the spaces between the shanks of the fasteners, and means spaced along the path from the plastic material dispensing means in the direction of movement of the conveying means for separating the fasteners from the conveying means with the individual fasteners joined by the united coatings on the webs.

6. An apparatus for making a strip of fasteners having shanks comprising
conveying means moving along a predetermined path,
fastener feeding means for feeding successive fasteners to the conveying means to be supported in spaced positions on the conveying means and moved along the path,
a pair of roller means disposed on opposite sides of the path spaced from the fastener feeding means in the direction of movement of the conveying means, the shanks of the fasteners passing through the nip formed by the pair of roller means,
web feeding means including the pair of roller means for feeding two webs of material into engagement with the shanks of the fasteners in transversely aligned positions,
a pair of plastic material feeding means disposed adjacent the pair of roller means and operable to apply a bead of fluid plastic material to the webs passing around the roller means prior to feeding the webs into engagement with the shanks, said beads of plastic material being united to provide a unitary body of plastic material joining the fasteners,
and ejecting means spaced from the roller means along the path in the direction of movement of the conveying means for removing the joined fasteners from the conveying means.

7. The apparatus set forth in claim 6 in which the ejecting means includes means for severing the plastic material and the two webs at spaced intervals to provide strips of joined fasteners of a given length.

8. An apparatus for making strips from nails each having a head and a shank comprising
conveying means having nail supporting means and movable along a given path,
nail feeding means disposed adjacent the conveying means for feeding successive nails to the nail supporting means on conveying means, said nails being supported on the conveying means with the shanks spaced from each other and extending generally transverse but inclined relative to the direction of movement of the conveying means,
a pair of roller means disposed on opposite sides of the conveying means spaced from the nail feeding means in the direction of movement of the conveying means, said roller means being mounted for rotation about generally parallel axes extending transverse to the direction of movement of the conveying means, said pair of roller means defining a nip through which the shanks of the nails carried on the conveying means pass,
web feeding means for supplying two webs of flexible material that pass around the roller means to be fed adjacent opposite sides of the shanks aligned with each other,
and means for applying a bead of plastic material to each of the webs as the webs pass around the roller means so that the webs apply the plastic material to the shanks to form a unitary plastic body joining the nails together.

9. An apparatus for making strips of nails comprising a flexible conveying means including a plurality of nail supporting sections movably joined together, said sections also having connected guide means,
structure forming guideway means for receiving the guide means on the nail supporting sections to guide the sections for movement along a predetermined path,
nail feeding means disposed adjacent the path for feeding nails in sequence to the nail supporting sections, said nail feeding means feeding each nail in an inclined position in which the opposite ends of the shank of the nail are disposed in spaced positions considered in the direction of movement of the conveying means,
means for applying a bead of plastic material to the shanks of the nails moving with the conveying means to join the nails in a strip in their inclined positions,
and means disposed beyond the structure forming the guideway for ejecting the joined nails from the conveying means.

10. An apparatus for making strips of nails comprising a flexible conveying means formed of two lengths of pivotally connected nail supporting units, each of the units having roller means and a slotted shank engaging structure,
means defining a pair of guide slots and two walls, the roller means on the two lengths of nail supporting units being received in the guide slots to position the units so that the slotted shank engaging structures are effectively closed by the two walls as the units are moved along a fixed path of movement guided by the roller means and guide slots,
nail feeding means for feeding nails to the conveying means, said nail feeding means including apertures in the two walls offset from each other in the direction of movement of the conveying means to expose the slotted shank engaging structures and means for advancing successive nails through the apertures to be supported in the slotted structures in an inclined position,
means spaced along the path of movement of the conveying means for applying a flexible bonding material to join the shanks of the nails,
and means disposed beyond the walls for ejecting the joined nails from the conveying means.

11. An apparatus for making strips of nails comprising a flexible conveying means formed of two lengths of pivotally connected nail supporting units, each of the units having roller means and a slotted shank engaging structure,
means defining a pair of guide slots and two walls, the roller means on the two lengths of nail supporting units being received in the guide slots to position the units so that the slotted shank engaging structures are effectively closed by the two walls as the units are moved along a fixed path of movement guided by the roller means and guide slots,
nail feeding means for feeding nails to the conveying means, said nail feeding means including apertures in the two walls offset from each other in the direction of movement of the conveying means to expose the slotted structures and means for advancing successive nails through the apertures to be supported in the slotted structures in an inclined position,
tape feeding means disposed on opposite sides of the path of movement for feeding two lengths of flexible web material into engagement with the nails in opposed positions,
dispensing means for applying adhering material to the web material prior to its engagement with the nails, and means spaced beyond the ends of the walls for discharging the joined nails from the conveying means.

12. An apparatus for handling headed nails having shanks comprising a flexible conveying means including a pair of flexible loops carrying nail engaging means having outwardly open nail receiving openings, said flexible loops being driven through a given path of movement in a spaced relationship, a retaining structure including a pair of walls extending along at least a part of the path of movement of the flexible loops, said walls being aligned with and disposed adjacent the nail engaging means to effectively close the nail receiving openings, the walls including two apertures spaced from each other along the path of movement and aligned with the nail engaging means on the two loops, nail feeding means for feeding nails in succession to the flexible conveying means to be moved thereby, the nail feeding means including means for feeding individual nails in an inclined position through the spaced apertures to be received in the openings on the nail engaging structure, the walls effectively closing the openings to retain the nails in inclined positions on the conveying means, and means disposed beyond the walls for removing the nails from the conveying means.

13. An apparatus for handling headed nails having shanks comprising a flexible conveying means including a pair of flexible loops carrying nail engaging means having outwardly open nail receiving openings, said flexible loops being driven through a given path of movement in a spaced relationship, a retaining structure including a pair of walls extending along at least a part of the path of movement of the flexible loops, said walls being disposed generally opposite the nail engaging means, the walls including two apertures spaced from each other along the path of movement and aligned with the nail engaging means on the two loops, guideway means aligned with the apertures and adapted to receive a plurality of aligned nails supported from their heads, drive means bearing against the shanks of the nails for biasing the nails through the apertures into engagement with the conveying means to feed successive nails into successive openings in the nail engaging means, and means positioned beyond the walls for removing the nails from the conveying means.

14. The apparatus set forth in claim 13 in which the drive means includes rotatable resilient means having a truncated conical configuration positioned with the greater diameter portion disposed adjacent the lower ends of the shanks.

References Cited by the Examiner
UNITED STATES PATENTS

| | | | |
|---|---|---|---|
| 1,883,113 | 10/1932 | Titchener | 156—297 |
| 2,547,836 | 4/1951 | Pfeiffer | 53—200 |
| 3,165,868 | 1/1965 | MacDonald et al. | 53—244 X |

FRANK E. BAILEY, *Primary Examiner.*

R. L. FARRIS, *Assistant Examiner.*